(12) United States Patent
Zhao et al.

(10) Patent No.: US 11,550,131 B2
(45) Date of Patent: Jan. 10, 2023

(54) IMAGING APPARATUS AND ELECTRONIC DEVICE

(71) Applicant: Zhejiang Sunny Optical Co., Ltd, Ningbo (CN)

(72) Inventors: Liefeng Zhao, Ningbo (CN); Jia Lu, Ningbo (CN); Mengna Tang, Ningbo (CN); Jianke Wenren, Ningbo (CN); Fujian Dai, Ningbo (CN)

(73) Assignee: Zhejiang Sunny Optical Co., Ltd

( * ) Notice: Subject to any disclaimer, the term of this patent is extended or adjusted under 35 U.S.C. 154(b) by 386 days.

(21) Appl. No.: 16/893,900

(22) Filed: Jun. 5, 2020

(65) Prior Publication Data

US 2021/0018732 A1 Jan. 21, 2021

(51) Int. Cl.
*G02B 13/02* (2006.01)
*G02B 13/00* (2006.01)
*G02B 13/06* (2006.01)
*G02B 27/00* (2006.01)

(52) U.S. Cl.
CPC ......... *G02B 13/02* (2013.01); *G02B 13/0045* (2013.01); *G02B 13/06* (2013.01); *G02B 27/0025* (2013.01)

(58) Field of Classification Search
CPC .... G02B 13/02; G02B 13/0045; G02B 13/06; G02B 13/04; G02B 13/24; G02B 13/18; G02B 13/22; G02B 15/06; G02B 15/10; G02B 15/22; G03B 17/12
See application file for complete search history.

(56) References Cited

U.S. PATENT DOCUMENTS

| | | | |
|---|---|---|---|
| 2018/0352125 A1* | 12/2018 | Ho | G03B 15/00 |
| 2019/0025545 A1* | 1/2019 | Nakamura | G02B 13/02 |
| 2019/0204556 A1 | 7/2019 | Jhang et al. | |

FOREIGN PATENT DOCUMENTS

EP 2555034 A1 2/2013

* cited by examiner

*Primary Examiner* — Alicia M Harrington
(74) *Attorney, Agent, or Firm* — Barnes & Thornburg LLP

(57) ABSTRACT

The present disclosure discloses an imaging apparatus and an electronic device. The imaging apparatus includes a macro lens group, a wide-angle lens group, and a telephoto lens group. An effective focal length $f_A$ of the macro lens group, an effective focal length $f_B$ of the wide-angle lens group and an effective focal length $f_C$ of the telephoto lens group satisfy: $f_A < f_B < f_C$, $0.20 < f_A/f_B < 0.80$ and $0.10 < f_A/f_C < 0.50$.

20 Claims, 14 Drawing Sheets

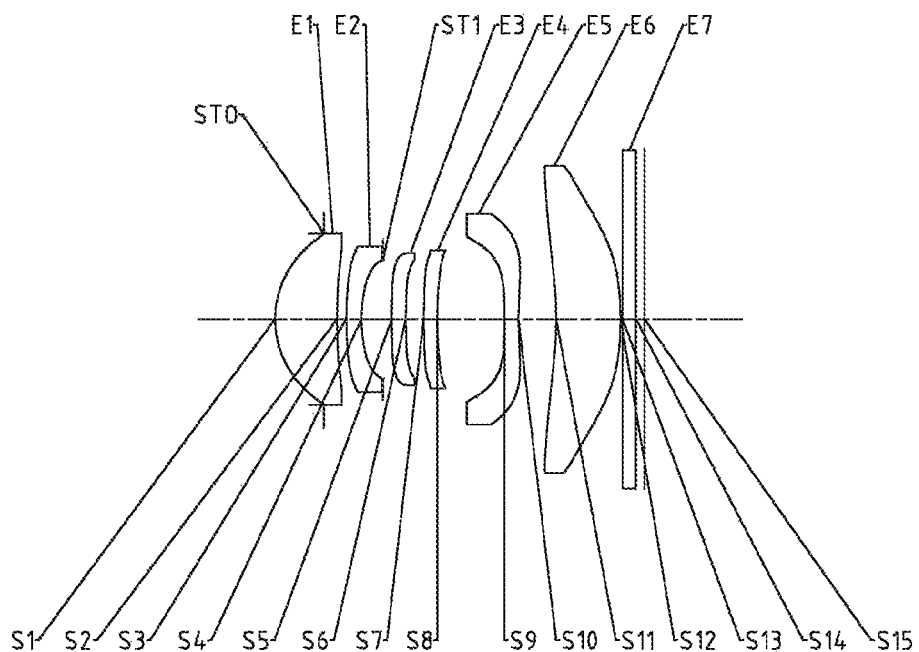
Fig. 14
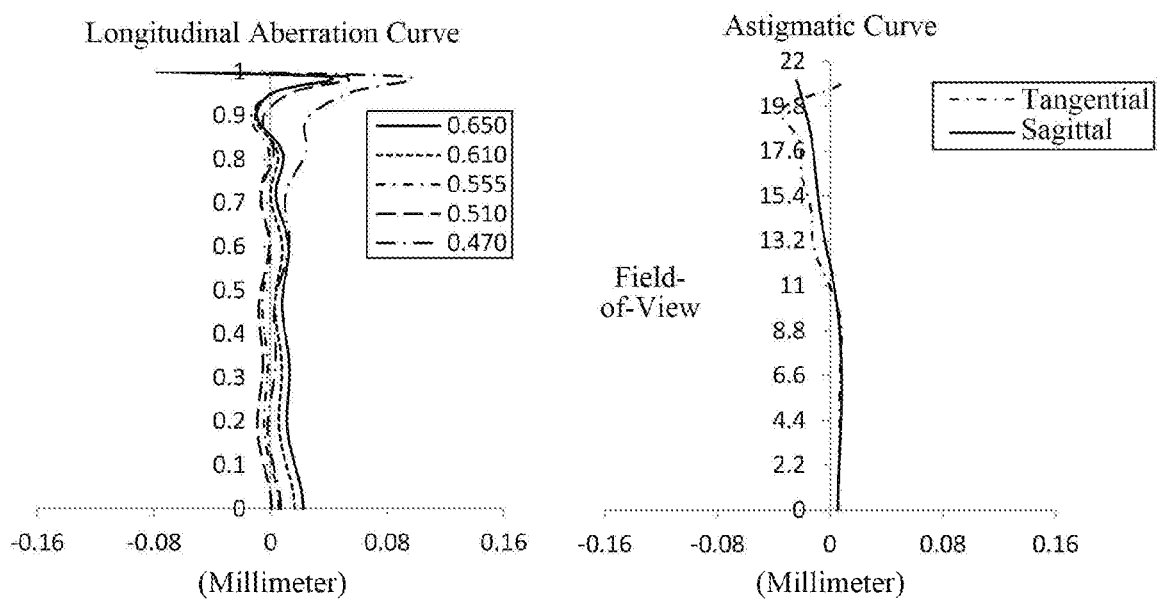
Fig. 15A
Fig. 15B

IMAGING APPARATUS AND ELECTRONIC DEVICE

CROSS-REFERENCE TO RELATED APPLICATION

This application claims benefit of priority to Chinese Patent Application No. 201910651695.2 filed on Jul. 18, 2019 before the China National Intellectual Property Administration, the entire disclosure of which is incorporated herein by reference in its entity.

TECHNICAL FIELD

The present disclosure relates to the field of optical components, and specifically, relates to an imaging apparatus and an electronic device.

BACKGROUND

With the advancement of science and technology and the development of economy, people are placing higher and higher requirements on the camera function of portable electronic devices. For example, people are placing increasingly higher requirements on the imaging quality, shooting range and shooting brightness of images captured by portable electronic devices. Traditional imaging apparatus with a single lens group sometimes cannot meet the shooting needs of multiple scenes. Therefore, an imaging apparatus with multiple lens groups is needed.

SUMMARY

The present disclosure provides an imaging apparatus, which includes a macro lens group having an effective focal length $f_A$, a wide-angle lens group having an effective focal length $f_B$, and a telephoto lens group having an effective focal length $f_C$, wherein $f_A < f_B < f_C$, $0.20 < f_A/f_B < 0.80$ and $0.10 < f_A/f_C < 0.50$.

In one embodiment, the effective focal length $f_A$ of the macro lens group satisfies: 1.0 mm$<f_A<$3.7 mm.

In one embodiment, the effective focal length $f_B$ of the wide-angle lens group satisfies: 4.6 mm$<f_B<$5.0 mm.

In one embodiment, the effective focal length $f_C$ of the telephoto lens group satisfies: 7.4 mm$<f_C<$7.7 mm.

In one embodiment, half of a diagonal length ImgH$_B$ of an effective pixel area on an imaging plane of the wide-angle lens group and half of a diagonal length ImgH$_C$ of an effective pixel area on an imaging plane of the telephoto lens group satisfy: 1.3<ImgH$_B$/ImgH$_C$<1.5.

In one embodiment, the effective focal length $f_A$ of the macro lens group and an entrance pupil diameter EPD$_A$ of the macro lens group satisfy: $f_A$/EPD$_A$<1.95.

In one embodiment, the effective focal length $f_B$ of the wide-angle lens group and an entrance pupil diameter EPD$_B$ of the wide-angle lens group satisfy: $f_B$/EPD$_B$<1.6.

In one embodiment, half of a maximal field-of-view Semi-FOV$_C$ of the telephoto lens group satisfies: 20°<Semi-FOV$_C$<21.5°.

In one embodiment, the macro lens group includes, sequentially from an object side to an image side along an optical axis of the macro lens group, a macro first lens having a refractive power, a macro second lens having a refractive power, a macro third lens having a positive refractive power, a macro fourth lens having a negative refractive power, a macro fifth lens having a positive refractive power, and a macro sixth lens having a refractive power.

In one embodiment, an object-side surface of the macro first lens is a convex surface, and an image-side surface of the macro first lens is a concave surface.

In one embodiment, an object-side surface of the macro second lens is a convex surface, and an image-side surface of the macro second lens is a concave surface.

In one embodiment, an object-side surface of the macro third lens is a convex surface, and an image-side surface of the macro third lens is a convex surface.

In one embodiment, an object-side surface of the fourth lens of the macro group is a concave surface.

In one embodiment, an object-side surface of the macro fifth lens is a convex surface.

In one embodiment, an object-side surface of the macro sixth lens is a convex surface, and an image-side surface of the macro sixth lens is a concave surface.

In one embodiment, there is a gap along the optical axis of the macro lens group between each two adjacent lenses of the macro lens group.

In one embodiment, the wide-angle lens group includes, sequentially from an object side to an image side along an optical axis of the wide-angle lens group, a wide-angle first lens having a positive refractive power, a wide-angle second lens having a positive refractive power, a wide-angle third lens having a negative refractive power, a wide-angle fourth lens having a refractive power, a wide-angle fifth lens having a positive refractive power, and a wide-angle sixth lens having a negative refractive power.

In one embodiment, an object-side surface of the wide-angle first lens is a convex surface, and an image-side surface of the wide-angle first lens is a concave surface.

In one embodiment, an object-side surface of the wide-angle second lens is a convex surface, and an image-side surface of the wide-angle second lens is a convex surface.

In one embodiment, an object-side surface of the wide-angle third lens is a convex surface, and an image-side surface of the wide-angle third lens is a concave surface.

In one embodiment, an image-side surface of the wide-angle fourth lens is a convex surface.

In one embodiment, an object-side surface of the wide-angle sixth lens is a convex surface, and an image-side surface of the wide-angle sixth lens is a concave surface.

In one embodiment, the effective focal length $f_B$ of the wide-angle lens group, an effective focal length f1$_B$ of the wide-angle first lens, an effective focal length f2$_B$ of the wide-angle second lens, and an effective focal length f6$_B$ of the wide-angle sixth lens satisfy: 0.7<$f_B$/(f1$_B$+f2$_B$+f6$_B$)<1.0.

In one embodiment, a radius of curvature R1$_B$ of an object-side surface of the wide-angle first lens, a radius of curvature R2$_B$ of an image-side surface of the wide-angle first lens, a radius of curvature R11$_B$ of an object-side surface of the wide-angle sixth lens, and a radius of curvature R12$_B$ of an image-side surface of the wide-angle sixth lens satisfy: 1.3<(R1$_B$+R2$_B$)/(R11$_B$+R12$_B$)<1.9.

In one embodiment, half of a diagonal length ImgH$_B$ of an effective pixel area on an imaging plane of the wide-angle lens group and the effective focal length $f_B$ of the wide-angle lens group satisfy: 0.8<ImgH$_B$/$f_B$<0.9.

In one embodiment, there is a gap along the optical axis of the wide-angle lens group between each two adjacent lenses of the wide-angle lens group.

In one embodiment, the telephoto lens group includes, sequentially from an object side to an image side along an optical axis of the telephoto lens group, a telephoto first lens having a positive refractive power, a telephoto second lens having a negative refractive power, a telephoto third lens having a refractive power, a telephoto fourth lens having a negative refractive power, a telephoto fifth lens having a negative refractive power, and a telephoto sixth lens having a refractive power.

In one embodiment, an object-side surface of the telephoto first lens is a convex surface, and an image-side surface of the telephoto first lens is a concave surface.

In one embodiment, an object-side surface of the telephoto second lens is a convex surface, and an image-side surface of the telephoto second lens is a concave surface.

In one embodiment, an object-side surface of the telephoto third lens is a convex surface, and an image-side surface of the telephoto third lens is a concave surface.

In one embodiment, an object-side surface of the telephoto fourth lens is a convex surface, and an image-side surface of the telephoto fourth lens is a concave surface.

In one embodiment, an object-side surface of the telephoto fifth lens is a concave surface, and an image-side surface of the telephoto fifth lens is a concave surface.

In one embodiment, an object-side surface of the telephoto sixth lens is a concave surface, and an image-side surface of the telephoto sixth lens is a convex surface.

In one embodiment, the effective focal length $f_C$ of the telephoto lens group, an effective focal length $f1_C$ of the telephoto first lens, an effective focal length $f2_C$ of the telephoto second lens, and an effective focal length $f5_C$ of the telephoto fifth lens satisfy: $1.4<f_C/(f1_C+f2_C-f5_C)<1.8$.

In one embodiment, a radius of curvature $R9_C$ of an object-side surface of the telephoto fifth lens, a radius of curvature $R10_C$ of an image-side surface of the telephoto fifth lens, a radius of curvature $R11_C$ of an object-side surface of the telephoto sixth lens, and a radius of curvature $R12_C$ of an image-side surface of the telephoto sixth lens satisfy: $0.3<(R9_C+R10_C)/(R11_C+R12_C)<0.8$.

In one embodiment, there is a gap along the optical axis of the telephoto lens group between each two adjacent lenses of the telephoto lens group.

The present disclosure provides an electronic device including the above-mentioned imaging apparatus, a focus measuring apparatus and a processor. The macro lens group, the wide-angle lens group and the telephoto lens group are arranged in a horizontal direction or a vertical direction on one side of the electronic device. The focus measuring apparatus is connected to the imaging apparatus and is configured to obtain a distance of the imaging apparatus from the object. The processor is connected to the imaging apparatus and the focus measuring apparatus and is configured to: in response to the distance of the imaging apparatus from the object being between 30 mm and 90 mm, activate the macro lens group and deactivate the wide-angle lens group and the telephoto lens group; in response to the distance of the imaging apparatus from the object being between 1000 mm and 1500 mm, activate at least one of the wide-angle lens group and the telephoto lens group and deactivate the macro lens group.

The imaging apparatus and the electronic device provided in the examples of the present disclosure may have good imaging quality in various application scenarios.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIG. 14 illustrates a schematic structural view of a telephoto lens group according to Example 6 of the present disclosure;

FIGS. 15A to 15D illustrate a longitudinal aberration curve, an astigmatic curve, a distortion curve and a lateral color curve of the telephoto lens group of the Example 6, respectively;

DETAILED DESCRIPTION OF EMBODIMENTS

Figure 1:
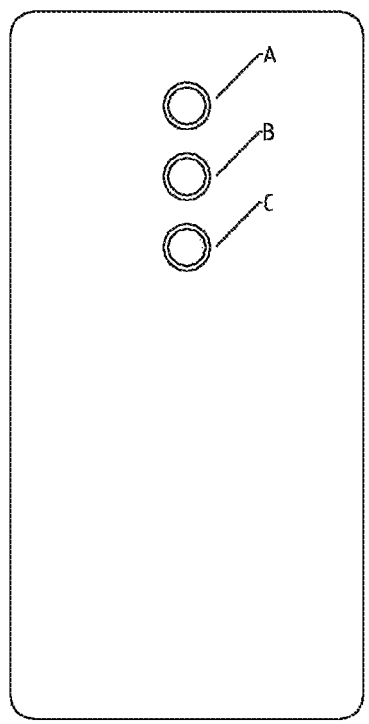
FIG. 1 is a schematic view illustrating an electronic device according to an embodiment of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

Figure 2:
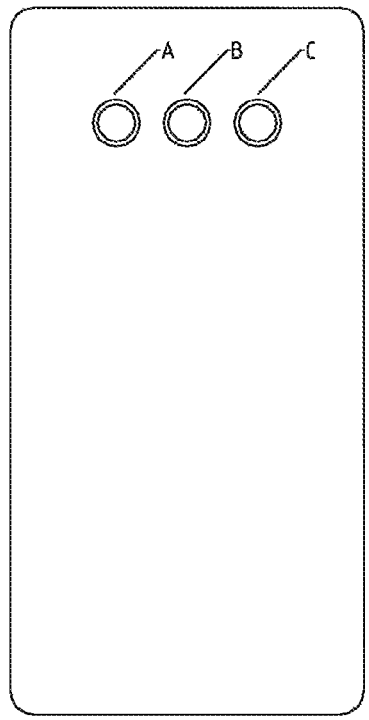
FIG. 2 is a schematic view illustrating an electronic device according to an embodiment of the present disclosure.

The present invention provides an imaging apparatus and an electronic device including the imaging apparatus. FIG. 1 and FIG. 2 are schematic views illustrating electronic devices according to embodiments of the present disclosure.

Referring to FIGS. 1 and 2, the imaging apparatus of the electronic device includes a macro lens group A, a wide-angle lens group B and a telephoto lens group C, wherein an effective focal length $f_A$ of the macro lens group A, an effective focal length $f_B$ of the wide-angle lens group B and an effective focal length $f_C$ of the telephoto lens group C satisfy: $f_A<f_B<f_C$, $0.20<f_A/f_B<0.80$ and $0.10<f_A/f_C<0.50$. By reasonably setting the relationship among the effective focal lengths of the above three lens groups, the imaging apparatus and the electronic device including the imaging apparatus may be applicable to various shooting application scenarios.

In an exemplary embodiment, the effective focal length $f_A$ of the macro lens group satisfies: $1.0$ mm$<f_A<3.7$ mm. In an exemplary embodiment, the effective focal length $f_B$ of the wide-angle lens group satisfies: $4.6$ mm$<f_B<5.0$ mm. In an exemplary embodiment, the effective focal length $f_C$ of the telephoto lens group satisfies: $7.4$ mm$<f_C<7.7$ mm. By setting the effective focal lengths of the macro lens group, the wide-angle lens group, and the telephoto lens group within the above range, the imaging apparatus may clearly image objects at different distances.

In an exemplary embodiment, the effective focal length $f_A$ of the macro lens group and an entrance pupil diameter $EPD_A$ of the macro lens group satisfy: $f_A/EPD_A<1.95$. Controlling the ratio of the effective focal length $f_A$ of the macro lens group to the entrance pupil diameter $EPD_A$ of the macro lens group within a reasonable value range may effectively increase the light flux of the lens group, make the lens system have higher relative illuminance, and improve the shooting effect in the dark environment, and thus improve the imaging quality of the macro lens group.

In an exemplary embodiment, the effective focal length $f_B$ of the wide-angle lens group and an entrance pupil diameter $EPD_B$ of the wide-angle lens group satisfy: $f_B/EPD_B<1.6$. By reasonably controlling the proportional relationship between the effective focal length and the entrance pupil diameter of the wide-angle lens group, the wide-angle lens group has a large light flux to ensure that sufficient imaging light enters the wide-angle lens group when shooting in dark scenes and improve the brightness of the imaging surface, and thus obtain a good imaging effect.

In an exemplary embodiment, half of a maximal field-of-view Semi-$FOV_C$ of the telephoto lens group satisfies: $20°<$Semi-$FOV_C<21.5°$. Controlling the field-of-view of the telephoto lens group within a suitable value range helps to increase the image height of the telephoto lens group, while avoiding excessive aberrations at the edge of the field of view, thereby helping to better maintain the wider imaging range of the system and improve the image quality of the telephoto lens group. In addition, by controlling half of the maximal field-of-view of the telephoto lens group within the above range, the telephoto lens group may have a wide field of view to ensure that users enjoy a good shooting experience.

In an exemplary embodiment, the macro lens group includes, sequentially from an object side to an image side along an optical axis of the macro lens group, a macro first lens having a refractive power, a macro second lens having a refractive power, a macro third lens having a positive refractive power, a macro fourth lens having a negative refractive power, a macro fifth lens having a positive refractive power, and a macro sixth lens having a refractive power. Reasonably assigning the refractive power of each lens in the lens group is beneficial to reduce the spherical aberration, astigmatic and coma of the macro lens group, thereby improving the imaging quality of the system.

In an exemplary embodiment, an object-side surface of the macro first lens is a convex surface, and an image-side surface of the macro first lens is a concave surface; an object-side surface of the macro second lens is a convex surface, and an image-side surface of the macro second lens is a concave surface; an object-side surface of the macro third lens is a convex surface, and an image-side surface of the macro third lens is a convex surface; an object-side surface of the macro fourth lens is a concave surface; an object-side surface of the macro fifth lens is a convex surface; and an object-side surface of the macro sixth lens is a convex surface, and an image-side surface of the macro sixth lens is a concave surface. Reasonably setting the surface type of each lens in the macro lens group may reduce the aberration of the lens group to improve the imaging quality of the lens group.

In an exemplary embodiment, the wide-angle lens group includes, sequentially from an object side to an image side along an optical axis of the wide-angle lens group, a wide-angle first lens having a positive refractive power, a wide-angle second lens having a positive refractive power, a wide-angle third lens having a negative refractive power, a wide-angle fourth lens having a refractive power, a wide-angle fifth lens having a positive refractive power, and a wide-angle sixth lens having a negative refractive power. Reasonably assigning the refractive power of each lens in the lens group is beneficial to reduce the spherical aberration, astigmatic and coma of the imaging apparatus to improve the imaging quality.

In an exemplary embodiment, an object-side surface of the wide-angle first lens is a convex surface, and an image-side surface of the wide-angle first lens is a concave surface; an object-side surface of the wide-angle second lens is a convex surface, and an image-side surface of the wide-angle second lens is a convex surface; an object-side surface of the wide-angle third lens is a convex surface, and an image-side surface of the wide-angle third lens is a concave surface; an image-side surface of the wide-angle fourth lens is a convex surface; and an object-side surface of the wide-angle sixth lens is a convex surface, and an image-side surface of the wide-angle sixth lens is a concave surface. Reasonably setting the surface type of each lens in the wide-angle lens group is beneficial to reduce aberrations, thereby improving the imaging quality of the wide-angle lens group.

In an exemplary embodiment, the effective focal length $f_B$ of the wide-angle lens group, an effective focal length $f1_B$ of the wide-angle first lens, an effective focal length $f2_B$ of the wide-angle second lens, and an effective focal length $f6_B$ of the wide-angle sixth lens satisfy: $0.7<f_B/(f1_B+f2_B+f6_B)<1.0$. Reasonably setting the above effective focal lengths is conducive to reducing the size of the wide-angle lens group and further reducing the aberration of the entire system, thereby reducing the sensitivity of the system. In addition, setting the above effective focal lengths within the above range may prevent the refractive power distribution of the wide-angle lens group from being excessively concentrated, and make the wide-angle lens group have a better processability.

In an exemplary embodiment, a radius of curvature $R1_B$ of an object-side surface of the wide-angle first lens, a radius of curvature $R2_B$ of an image-side surface of the wide-angle first lens, a radius of curvature $R11_B$ of an object-side surface of the wide-angle sixth lens, and a radius of curvature $R12_B$ of an image-side surface of the wide-angle sixth lens satisfy: $1.3<(R1_B+R2_B)/(R11_B+R12_B)<1.9$, for example, $1.5<(R1_B+R2_B)/(R11_B+R12_B)<1.8$. Reasonably setting the relationship among $R1_B$, $R2_B$, $R11_B$ and $R12_B$ may effectively reduce the chief ray angle of light entering the imaging surface to achieve matching with the CRA (Chief Ray Angle, chief ray tilt angle) of the chip, at the same time, reduce the deflection angle of the light between the wide-angle first lens and the wide-angle sixth lens and reduce the sensitivity of the above-mentioned two lenses.

In an exemplary embodiment, half of a diagonal length $ImgH_B$ of an effective pixel area on an imaging plane of the wide-angle lens group and the effective focal length $f_B$ of the wide-angle lens group satisfy: $0.8<ImgH_B/f_B<0.9$. Reasonably setting the proportional relationship between $ImgH_B$ and $f_B$ is beneficial for the wide-angle lens group to capture the image information of the scene within a larger field-of-view, and improve the brightness of the imaging surface for high-definition imaging.

In an exemplary embodiment, the telephoto lens group includes, sequentially from an object side to an image side along an optical axis of the telephoto lens group, a telephoto first lens having a positive refractive power, a telephoto second lens having a negative refractive power, a telephoto third lens having a refractive power, a telephoto fourth lens having a negative refractive power, a telephoto fifth lens having a negative refractive power, and a telephoto sixth lens having a refractive power. Reasonably assigning the refractive power of each lens in the lens group is beneficial to reduce the spherical aberration, astigmatic and coma of the imaging apparatus, thereby improving the imaging quality.

In an exemplary embodiment, an object-side surface of the telephoto first lens is a convex surface, and an image-side surface of the telephoto first lens is a concave surface; an object-side surface of the telephoto second lens is a convex surface, and an image-side surface of the telephoto second lens is a concave surface; an object-side surface of the telephoto third lens is a convex surface, and an image-side surface of the telephoto third lens is a concave surface; an object-side surface of the telephoto fourth lens is a convex surface, and an image-side surface of the telephoto fourth lens is a concave surface; an object-side surface of the telephoto fifth lens is a concave surface, and an image-side surface of the telephoto fifth lens is a concave surface; and an object-side surface of the telephoto sixth lens is a concave surface, and an image-side surface of the telephoto sixth lens is a convex surface. Reasonably setting the surface type of each lens in the telephoto lens group is beneficial to reduce aberrations, thereby improving the imaging quality of the imaging apparatus.

In an exemplary embodiment, the effective focal length $f_C$ of the telephoto lens group, an effective focal length $f1_C$ of the telephoto first lens, an effective focal length $f2_C$ of the telephoto second lens, and an effective focal length $f5_C$ of the telephoto fifth lens satisfy: $1.4<f_C/(f1_C+f2_C-f5_C)<1.8$. Reasonably controlling the relationship among $f_C$, $f1_C$, $f2_C$, and $f5_C$ may effectively avoid excessive concentration of refractive power in the lens group, improve the aberration correction capability of the imaging apparatus, and may effectively reduce the size of the imaging apparatus while ensuring the telephoto characteristics of the system.

In an exemplary embodiment, a radius of curvature $R9_C$ of an object-side surface of the telephoto fifth lens, a radius of curvature $R10_C$ of an image-side surface of the telephoto fifth lens, a radius of curvature $R11_C$ of an object-side surface of the telephoto sixth lens, and a radius of curvature $R12_C$ of an image-side surface of the telephoto sixth lens satisfy: $0.3<(R9_C+R10_C)/(R11_C+R12_C)<0.8$. Reasonably controlling the relationship among $R9_C$, $R10_C$, $R11_C$ and $R12_C$ may not only ensure that the chief ray angle of the telephoto lens group matches the photosensitive chip, but also avoid the strong total reflection type ghost image caused by the excessive deflection angle of the light, thereby achieving a balance of various aberrations.

In an exemplary embodiment, there is a gap along the optical axis between each two adjacent lenses of each of the macro lens group, the wide-angle lens group, and the telephoto lens group. Reasonably configuring the gap width between adjacent lenses and ensuring that there are no cemented lenses in the lens group may alleviate the deflection of the light between the lenses and avoid the damage caused by the collision of adjacent lenses during the assembly of the lens group. In practice, the gap between adjacent lenses may be ensured by providing spacer or septum between adjacent lenses. In this case, the spacer or septum added in the gap between the lenses may also enhance the structural stability of the lens group.

Figure 3:
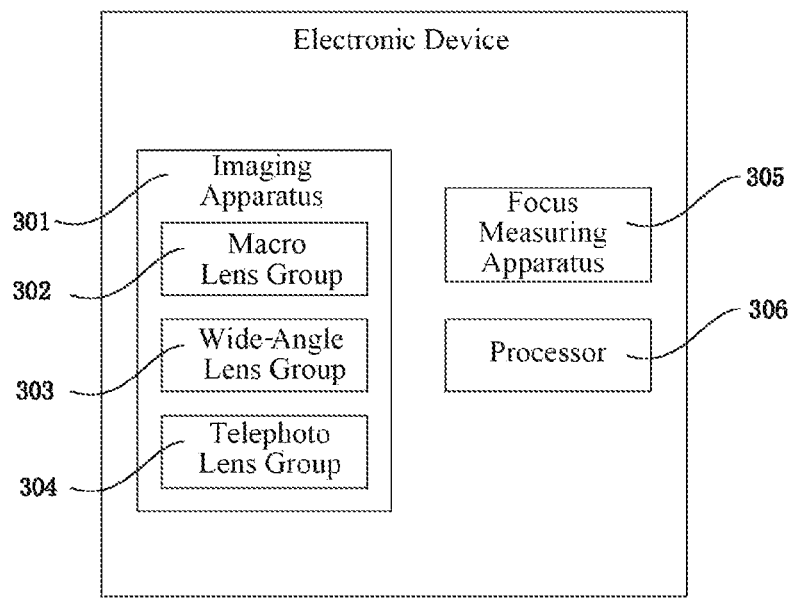
FIG. 3 is a block diagram illustrating an electronic device according to an embodiment of the present disclosure.

Exemplary embodiments of the present disclosure also provide an electronic device. FIG. 3 is a schematic view illustrating an electronic device according to the embodiment of the present disclosure. As shown in FIG. 3, the electronic device includes an imaging apparatus 301 of the foregoing examples, a focus measuring apparatus 305, and a processor 306. The imaging apparatus 301 includes a macro lens group 302, a wide-angle lens group 303, and a telephoto lens group 304. The macro lens group 302, the wide-angle lens group 303, and the telephoto lens group 304 are arranged along a horizontal direction or a vertical direction on one side of the electronic device. For example, the macro lens group 302, the wide-angle lens group 303, and the telephoto lens group 304 may be arranged along the horizontal direction or the vertical direction of the electronic device according to the arrangement of other components in the electronic device. The focus measuring apparatus 305 is connected to the imaging apparatus 301 and is configured to obtain a distance of the imaging apparatus 301 from the object. The processor 306 is connected to the imaging apparatus 301 and the focus measuring apparatus 305 and is configured to: in response to the distance of the imaging apparatus 301 from the object being between 30 mm and 90 mm, activate the macro lens group 302 and deactivate the wide-angle lens group 303 and the telephoto lens group 304; in response to the distance of the imaging apparatus 301 from the object being between 1000 mm and 1500 mm, activate at least one of the wide-angle lens group 303 and the telephoto lens group 304 and deactivate the macro lens group 302. The distance between the imaging apparatus 301 and the to-be-captured object may be obtained by focus measuring apparatus 306 in the way of laser distance measurement, or may be obtained by analyzing the sharpness of object edges in the acquired image frame to estimate the corresponding distance. By switching different lens groups when shooting objects at different distances, high-quality imaging may be achieved in a variety of shooting scenarios.

The specific configuration of each lens group will be described in detail in conjunction with Examples 1 to 8, which are compatible with each other. As described in detail below, Examples 1 to 2 are macro lens groups applicable to the imaging apparatus of the present disclosure, Examples 3 to 5 are wide-angle lens groups applicable to the imaging apparatus of the present disclosure and Examples 6 to 8 are telephoto lens groups applicable to the imaging apparatus of the present disclosure. Although the various features of the lenses are specifically defined in the various examples, however, those skilled in the art should understand that the number of lenses constituting the imaging apparatus may be varied to achieve the various results and advantages described in this specification without departing from the technical solution claimed by the present disclosure. The following examples may form 18 different imaging apparatuses according to the combination of lens group types thereof. The configurations of these imaging apparatuses are as follows:

1) Example 1+Example 3+Example 6;
2) Example 1+Example 3+Example 7;
3) Example 1+Example 3+Example 8;
4) Example 1+Example 4+Example 6;
5) Example 1+Example 4+Example 7;
6) Example 1+Example 4+Example 8;
7) Example 1+Example 5+Example 6;
8) Example 1+Example 5+Example 7;
9) Example 1+Example 5+Example 8;
10) Example 2+Example 3+Example 6;
11) Example 2+Example 3+Example 7;
12) Example 2+Example 3+Example 8;
13) Example 2+Example 4+Example 6;
14) Example 2+Example 4+Example 7;
15) Example 2+Example 4+Example 8;
16) Example 2+Example 5+Example 6;
17) Example 2+Example 5+Example 7; and
18) Example 2+Example 5+Example 8.

Some specific examples of an optical imaging lens assembly applicable to the above embodiment will be further described below with reference to the accompanying drawings.

EXAMPLE 1

Figure 4:
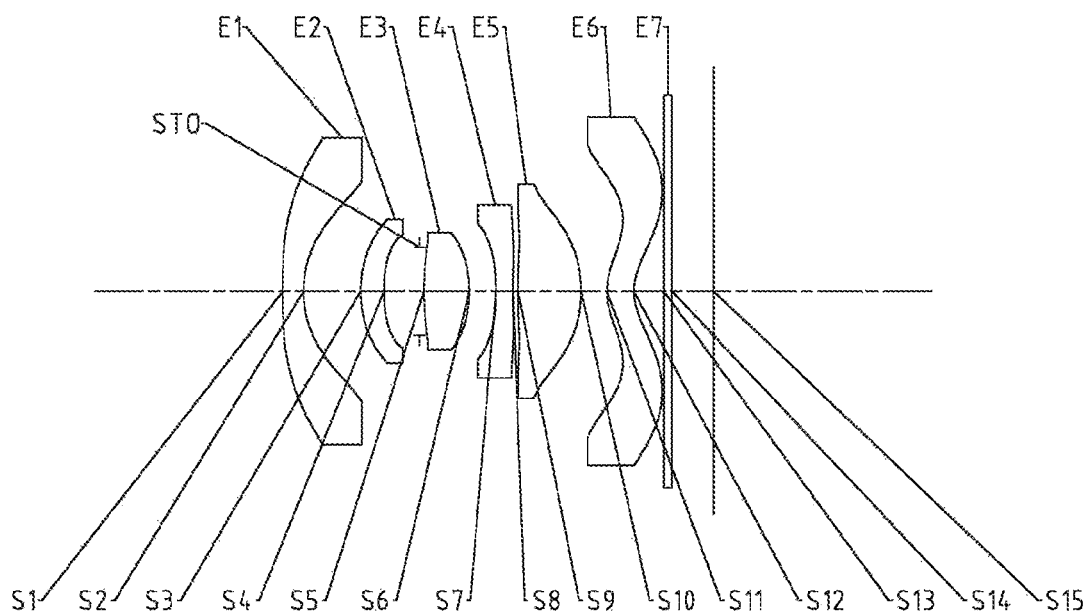
FIG. 4 illustrates a schematic structural view of a macro lens group according to Example 1 of the present disclosure.

A macro lens group according to example 1 of the present disclosure is described below with reference to FIG. 4 to FIG. 5D. FIG. 4 shows a schematic structural view of the macro lens group according to example 1 of the present disclosure.

As shown in FIG. 4, the macro lens group includes a macro first lens E1, a macro second lens E2, a stop STO, a macro third lens E3, a macro fourth lens E4, a macro fifth lens E5, a macro sixth lens E6, an optical filter E7 and an imaging plane S15, which are sequentially from an object side to an image side along an optical axis of the macro lens group.

The macro first lens E1 has a negative refractive power, an object-side surface S1 thereof is a convex surface, and an image-side surface S2 thereof is a concave surface. The macro second lens E2 has a positive refractive power, an object-side surface S3 thereof is a convex surface, and an image-side surface S4 thereof is a concave surface. The macro third lens E3 has a positive refractive power, an object-side surface S5 thereof is a convex surface, and an image-side surface S6 thereof is a convex surface. The macro fourth lens E4 has a negative refractive power, an object-side surface S7 thereof is a concave surface, and an image-side surface S8 thereof is a concave surface. The macro fifth lens E5 has a positive refractive power, an object-side surface S9 thereof is a convex surface, and an image-side surface S1 thereof is a convex surface. The macro sixth lens E6 has a positive refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 1 shows a table of basic parameters of the macro lens group in example 1, wherein the units for the radius of curvature, the thickness and the focal length are millimetre (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 30.0000 | | | | |
| S1 | aspheric | 48.9181 | 0.1717 | 1.55 | 56.1 | −1.84 | 0.0000 |
| S2 | aspheric | 0.9828 | 0.4709 | | | | −0.3795 |
| S3 | aspheric | 0.9552 | 0.1926 | 1.62 | 25.9 | 4.54 | 0.2138 |
| S4 | aspheric | 1.3329 | 0.2959 | | | | 6.6372 |
| STO | spherical | infinite | 0.0348 | | | | 0.0000 |
| S5 | aspheric | 2.3896 | 0.3752 | 1.55 | 56.1 | 1.35 | 9.3748 |
| S6 | aspheric | −1.0077 | 0.2202 | | | | 1.6145 |
| S7 | aspheric | −2.0530 | 0.1410 | 1.68 | 19.2 | −2.14 | 5.1264 |
| S8 | aspheric | 5.1618 | 0.0419 | | | | 0.0000 |
| S9 | aspheric | 4.1621 | 0.5219 | 1.55 | 56.1 | 1.77 | −71.1483 |
| S10 | aspheric | −1.2053 | 0.2130 | | | | 0.3090 |
| S11 | aspheric | 0.5118 | 0.2234 | 1.64 | 24.0 | 30.45 | −3.3479 |
| S12 | aspheric | 0.4359 | 0.2481 | | | | −2.3649 |
| S13 | spherical | infinite | 0.0660 | 1.52 | 64.2 | | |
| S14 | spherical | infinite | 0.3474 | | | | |
| S15 | spherical | infinite | | | | | |

In this example, a total effective focal length $f_A$ of the macro lens group satisfies $f_A$=1.02 mm, a distance $TTL_A$ along the optical axis of the macro lens group from the object-side surface S1 of the macro first lens E1 to the imaging plane S15 satisfies $TTL_A$=3.56 mm, half of a diagonal length $ImgH_A$ of an effective pixel area on the imaging plane S15 satisfies $ImgH_A$=1.83 mm, half of a maximal field-of-view Semi-$FOV_A$ of the macro lens group satisfies Semi-$FOV_A$=60.2°, and an ideal distance $P_A$ for the macro lens group along the optical axis of the macro lens group from the to-be-captured object to the object-side surface of the macro first lens satisfies $P_A$=30 mm.

In example 1, the object-side surface and the image-side surface of any one of the macro first lens E1 to the macro sixth lens E6 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis of the macro lens group; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16 and A18 applicable to each aspheric surface S1-S12 in example 1.

TABLE 2

| Surface number | A4 | A6 | A8 | A10 | A12 | A14 | A16 | A18 |
|---|---|---|---|---|---|---|---|---|
| S1 | 7.6428E−02 | −5.9910E−02 | 3.4612E−02 | −1.3900E−02 | 3.8160E−03 | −6.8000E−04 | 7.0400E−05 | −3.2000E−06 |
| S2 | 5.6381E−01 | −1.0786E+00 | −3.7964E−01 | 3.4466E+00 | −4.4080E+00 | 1.7465E+00 | 0.0000E+00 | 0.0000E+00 |
| S3 | −4.9180E−02 | 6.9162E−01 | −4.4200E+00 | 2.1239E+01 | −3.2053E+01 | 0.0000E+00 | 0.0000E+00 | 0.0000E+00 |
| S4 | 2.8284E−01 | 3.4887E−01 | 4.6342E+00 | −7.9692E+00 | 5.1564E+01 | 0.0000E+00 | 0.0000E+00 | 0.0000E+00 |
| S5 | −6.8410E−02 | −2.7907E−01 | −4.4790E−02 | −7.0481E+00 | 0.0000E+00 | 0.0000E+00 | 0.0000E+00 | 0.0000E+00 |
| S6 | −2.0710E−02 | 3.3040E−03 | 4.7500E−02 | −2.4034E−01 | 3.0599E−01 | 2.4885E−01 | −8.2666E−01 | 4.7055E−01 |
| S7 | −7.1170E−02 | −2.2354E−01 | 1.2634E+00 | −3.3628E+00 | 5.1862E+00 | −4.8404E+00 | 2.5271E+00 | −5.5642E−01 |
| S8 | −2.5740E−02 | −3.4577E−01 | 1.1467E+00 | −1.9234E+00 | 1.9620E+00 | −1.2139E+00 | 4.1831E−01 | −6.1520E−02 |
| S9 | 3.7059E−02 | −3.2172E−01 | 6.7775E−01 | −8.5848E−01 | 7.0967E−01 | −3.6305E−01 | 1.0344E−01 | −1.2590E−02 |
| S10 | −1.9026E−01 | 4.7733E−01 | −7.9930E−01 | 8.9298E−01 | −6.4741E−01 | 2.9131E−01 | −7.2280E−02 | 7.4350E−03 |
| S11 | −1.0664E−01 | −5.5000E−04 | 1.1218E−02 | 5.5300E−04 | −3.0900E−03 | 1.2670E−03 | −2.1000E−04 | 1.3600E−05 |
| S12 | −1.2610E−01 | 5.9629E−02 | −1.9550E−02 | 3.9750E−03 | −4.4000E−04 | 1.8400E−05 | 8.9300E−07 | −8.4000E−08 |

Figure 5A:
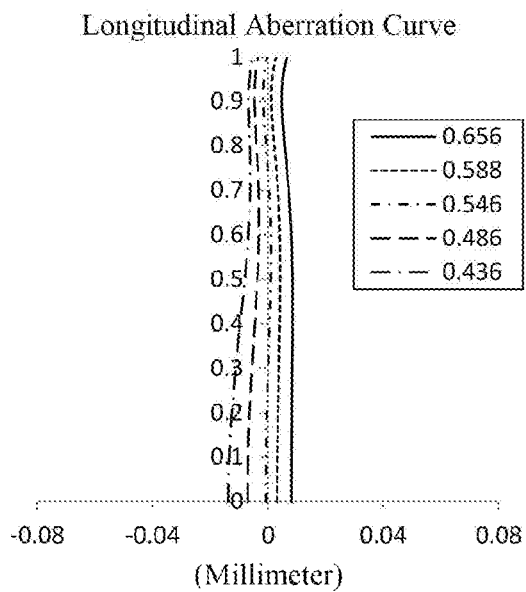
FIGS. 5A to 5D illustrate a longitudinal aberration curve, an astigmatic curve, a distortion curve and a lateral color curve of the macro lens group of the Example 1, respectively.
Figure 5B:
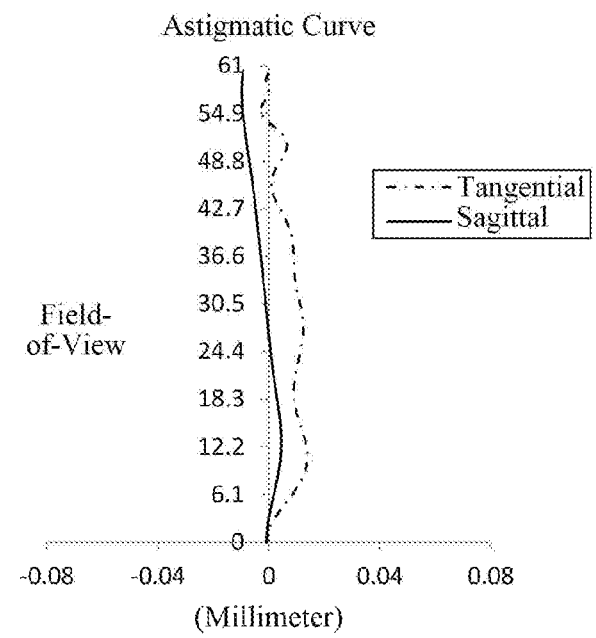
Figure 5C:
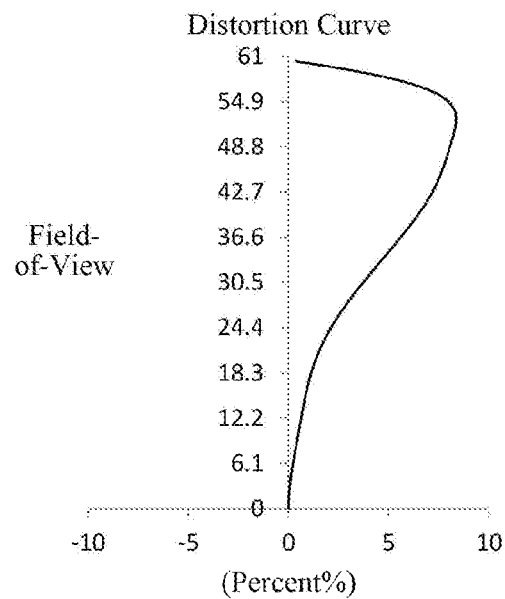
Figure 5D:
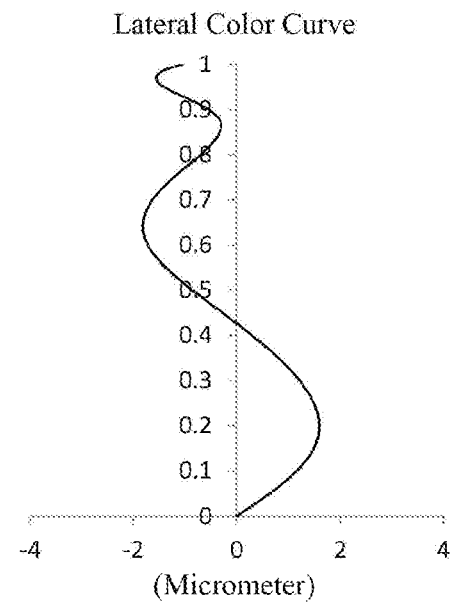

FIG. 5A illustrates a longitudinal aberration curve of the macro lens group according to example 1, representing deviations of focal points converged by light of different wavelengths after passing through the lens assembly. FIG. 5B illustrates an astigmatic curve of the macro lens group according to example 1, representing a curvature of a tangential plane and a curvature of a sagittal plane. FIG. 5C illustrates a distortion curve of the macro lens group according to example 1, representing amounts of distortion at different field-of-views. FIG. 5D illustrates a lateral color curve of the macro lens group according to example 1, representing deviations of different image heights on an imaging plane after light passes through the lens assembly. It can be seen from FIG. 5A to FIG. 5D that the macro lens group provided in example 1 may achieve a good image quality.

EXAMPLE 2

Figure 6:
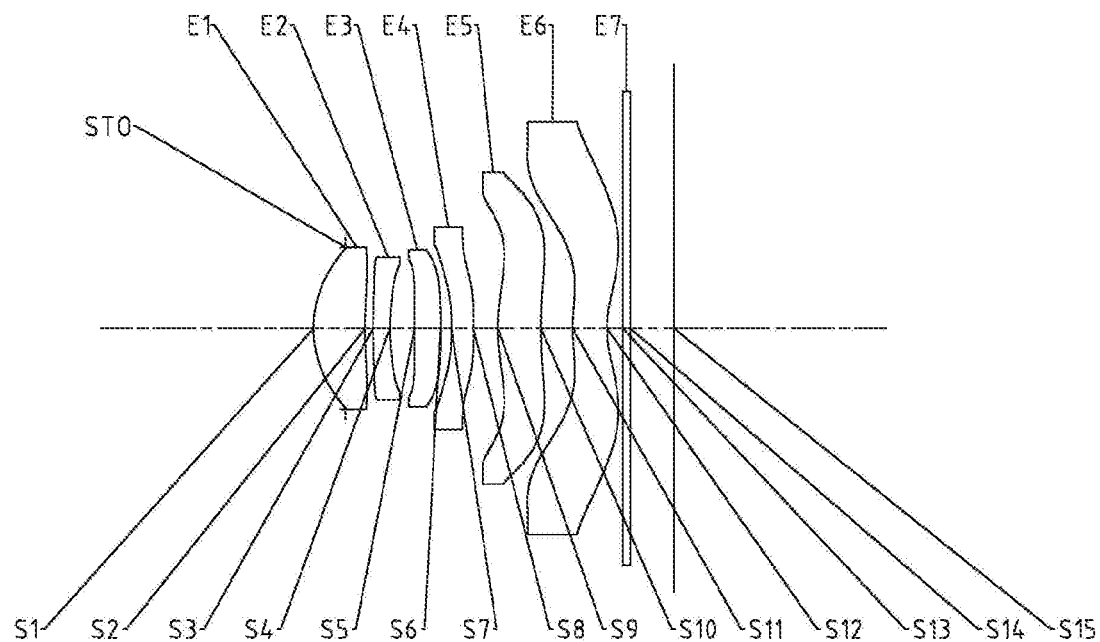
FIG. 6 illustrates a schematic structural view of a macro lens group according to Example 2 of the present disclosure.

A macro lens group according to example 2 of the present disclosure is described below with reference to FIG. 6 to FIG. 7D. FIG. 6 shows a schematic structural view of the macro lens group according to example 2 of the present disclosure.

As shown in FIG. 6, the macro lens group includes a stop STO, a macro first lens E1, a macro second lens E2, a macro third lens E3, a macro fourth lens E4, a macro fifth lens E5, a macro sixth lens E6, an optical filter E7 and an imaging plane S15, which are sequentially from an object side to an image side along an optical axis of the macro lens group.

The macro first lens E1 has a positive refractive power, an object-side surface S1 thereof is a convex surface, and an image-side surface S2 thereof is a concave surface. The macro second lens E2 has a negative refractive power, an object-side surface S3 thereof is a convex surface, and an image-side surface S4 thereof is a concave surface. The macro third lens E3 has a positive refractive power, an object-side surface S5 thereof is a convex surface, and an image-side surface S6 thereof is a convex surface. The macro fourth lens E4 has a negative refractive power, an object-side surface S7 thereof is a concave surface, and an image-side surface S8 thereof is a convex surface. The macro fifth lens E5 has a positive refractive power, an object-side surface S9 thereof is a convex surface, and an image-side surface S10 thereof is a concave surface. The macro sixth lens E6 has a negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 3 shows a table of basic parameters of the macro lens group in example 2, wherein the units for the radius of curvature, the thickness and the focal length are millimetre (mm).

TABLE 3

| Surface number | Surface type | Radius of curvature | Thickness/ Distance | Refractive index | Abbe number | Focal length | Conic coefficient |
|---|---|---|---|---|---|---|---|
| OBJ | spherical | infinite | 90.0000 | | | | |
| STO | spherical | infinite | −0.4067 | | | | |
| S1 | aspheric | 1.4204 | 0.6563 | 1.55 | 56.1 | 3.25 | −2.3008 |
| S2 | aspheric | 5.9837 | 0.1012 | | | | 1.6816 |
| S3 | aspheric | 6.0890 | 0.2119 | 1.67 | 20.4 | −8.69 | −47.2537 |
| S4 | aspheric | 2.9261 | 0.3113 | | | | −4.8908 |
| S5 | aspheric | 11.1261 | 0.3301 | 1.55 | 56.1 | 14.29 | 81.6701 |
| S6 | aspheric | −25.8507 | 0.1396 | | | | 99.0000 |
| S7 | aspheric | −4.3407 | 0.2791 | 1.67 | 24.0 | −9.44 | 13.9814 |
| S8 | aspheric | −14.3793 | 0.3114 | | | | −35.1105 |
| S9 | aspheric | 2.5963 | 0.5443 | 1.64 | 24.0 | 6.59 | 0.0000 |
| S10 | aspheric | 6.2140 | 0.4032 | | | | 2.1719 |
| S11 | aspheric | 2.6241 | 0.4369 | 1.55 | 56.1 | −5.12 | −0.3167 |
| S12 | aspheric | 1.2744 | 0.1978 | | | | −5.5559 |
| S13 | spherical | infinite | 0.0990 | 1.52 | 64.2 | | |
| S14 | spherical | infinite | 0.5499 | | | | |
| S15 | spherical | infinite | | | | | |

In this example, a total effective focal length $f_A$ of the macro lens group satisfies $f_A=3.69$ mm, a distance $TTL_A$ along the optical axis of the macro lens group from the object-side surface S1 of the macro first lens E1 to the imaging plane S15 satisfies $TTL_A=4.57$ mm, half of a diagonal length $ImgH_A$ of an effective pixel area on the imaging plane S15 satisfies $ImgH_A=3.33$ mm, half of a maximal field-of-view Semi-$FOV_A$ of the macro lens group satisfies Semi-$FOV_A=38.9°$, and an ideal distance $P_A$ for the macro lens group along the optical axis of the macro lens group from the to-be-captured object to the object-side surface of the macro first lens satisfies $P_A=90$ mm.

In example 2, the object-side surface and the image-side surface of any one of the macro first lens E1 to the macro sixth lens E6 are aspheric. Table 4 below shows high-order coefficients A4, A6, A8, A10, A12, A14, A16, A18 and A20 applicable to each aspheric surface S1-S12 in example 2.

TABLE 4

| Surface number | A4 | A6 | A8 | A10 | A12 | A14 | A16 | A18 |
|---|---|---|---|---|---|---|---|---|
| S1 | 6.5076E−02 | 5.0670E−03 | −5.4680E−02 | 1.9492E−01 | −3.8111E−01 | 4.4196E−01 | −3.0495E−01 | 1.1456E−01 |
| S2 | −8.2810E−02 | 7.4241E−02 | −4.5310E−02 | 1.7830E−02 | −3.5700E−02 | 4.5341E−02 | −2.7970E−02 | 8.7320E−03 |
| S3 | −1.3672E−01 | 2.0491E−01 | −2.4731E−01 | 7.8221E−01 | −2.0563E+00 | 3.1791E+00 | −2.8290E+00 | 1.3637E+00 |
| S4 | −7.6190E−02 | 1.8578E−01 | −2.6488E−01 | 8.6557E−01 | −1.9526E+00 | 2.3330E+00 | −1.0576E+00 | −2.9578E−01 |
| S5 | −8.1590E−02 | 3.0400E−02 | −2.2969E−01 | 2.2588E−01 | 6.6169E−01 | −2.9644E+00 | 4.7868E+00 | −3.6859E+00 |
| S6 | −1.0130E−01 | 3.1071E−02 | 1.5381E−01 | −9.9495E−01 | 2.2048E+00 | −2.7463E+00 | 2.0979E+00 | −9.3762E−01 |
| S7 | −1.8237E−01 | 1.4064E−01 | 3.9962E−01 | −1.5443E+00 | 2.6910E+00 | −2.5531E+00 | 1.3252E+00 | −3.4799E−01 |
| S8 | −2.1915E−01 | 1.4836E−01 | 1.3032E−01 | −5.0147E−01 | 7.4706E−01 | −6.0236E−01 | 2.6930E−01 | −6.3120E−02 |

TABLE 4-continued

| | | | | | | | |
|---|---|---|---|---|---|---|---|
| S9 | −7.6290E−02 | −2.1690E−02 | 4.0640E−02 | −4.3440E−02 | 2.9737E−02 | −1.2700E−02 | 3.2530E−03 | −4.5000E−04 |
| S10 | −5.8100E−03 | −1.8640E−02 | −4.6100E−03 | 1.0965E−02 | −6.7600E−03 | 2.3060E−03 | −4.6000E−04 | 5.1500E−05 |
| S11 | −2.8921E−01 | 1.6327E−01 | −7.6090E−02 | 2.6833E−02 | −6.3900E−03 | 9.9000E−04 | −9.6000E−05 | 5.3600E−06 |
| S12 | −1.3912E−01 | 8.0051E−02 | −3.7160E−02 | 1.2020E−02 | −2.5600E−03 | 3.5300E−04 | −3.1000E−05 | 1.5300E−06 |

| Surface number | A20 |
|---|---|
| S1 | −1.8500E−02 |
| S2 | −1.3800E−03 |
| S3 | −2.7630E−01 |
| S4 | 3.3817E−01 |
| S5 | 1.1378E+00 |
| S6 | 1.8865E−01 |
| S7 | 3.4787E−02 |
| S8 | 6.0790E−03 |
| S9 | 2.6000E−05 |
| S10 | −2.4000E−06 |
| S11 | −1.3000E−07 |
| S12 | −3.3000E−08 |

Figure 7A:
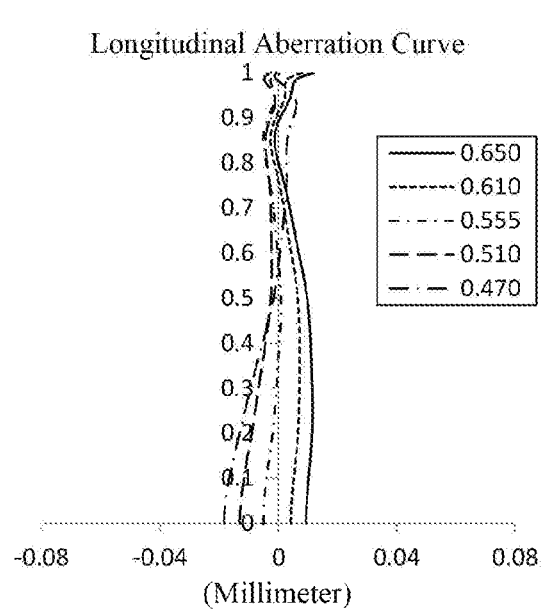
FIGS. 7A to 7D illustrate a longitudinal aberration curve, an astigmatic curve, a distortion curve and a lateral color curve of the macro lens group of the Example 2, respectively.
Figure 7B:
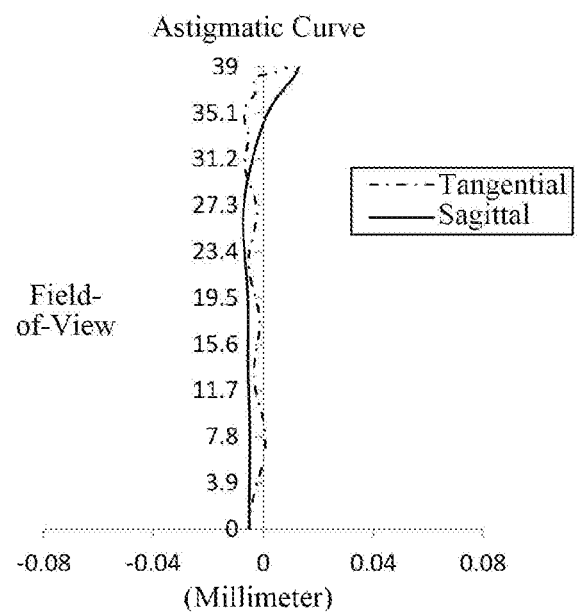
Figure 7C:
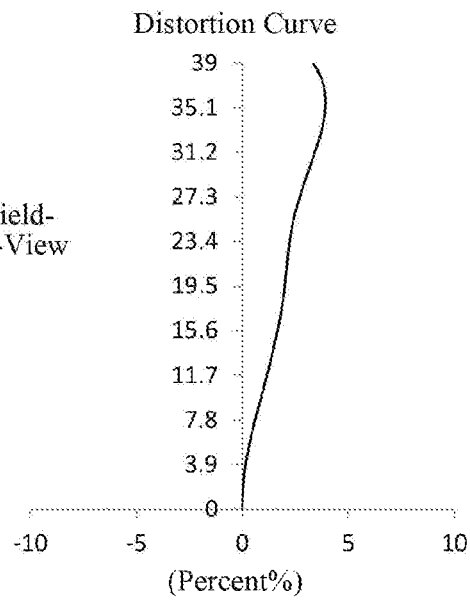
Figure 7D:
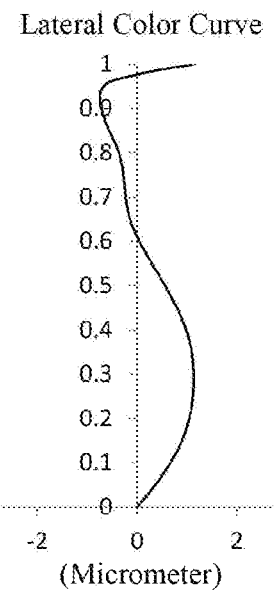

FIG. 7A illustrates a longitudinal aberration curve of the macro lens group according to example 2, representing deviations of focal points converged by light of different wavelengths after passing through the lens assembly. FIG. 7B illustrates an astigmatic curve of the macro lens group according to example 2, representing a curvature of a tangential plane and a curvature of a sagittal plane. FIG. 7C illustrates a distortion curve of the macro lens group according to example 2, representing amounts of distortion at different field-of-views. FIG. 7D illustrates a lateral color curve of the macro lens group according to example 2, representing deviations of different image heights on an imaging plane after light passes through the lens assembly. It can be seen from FIG. 7A to FIG. 7D that the macro lens group provided in example 2 may achieve a good image quality.

EXAMPLE 3

Figure 8:
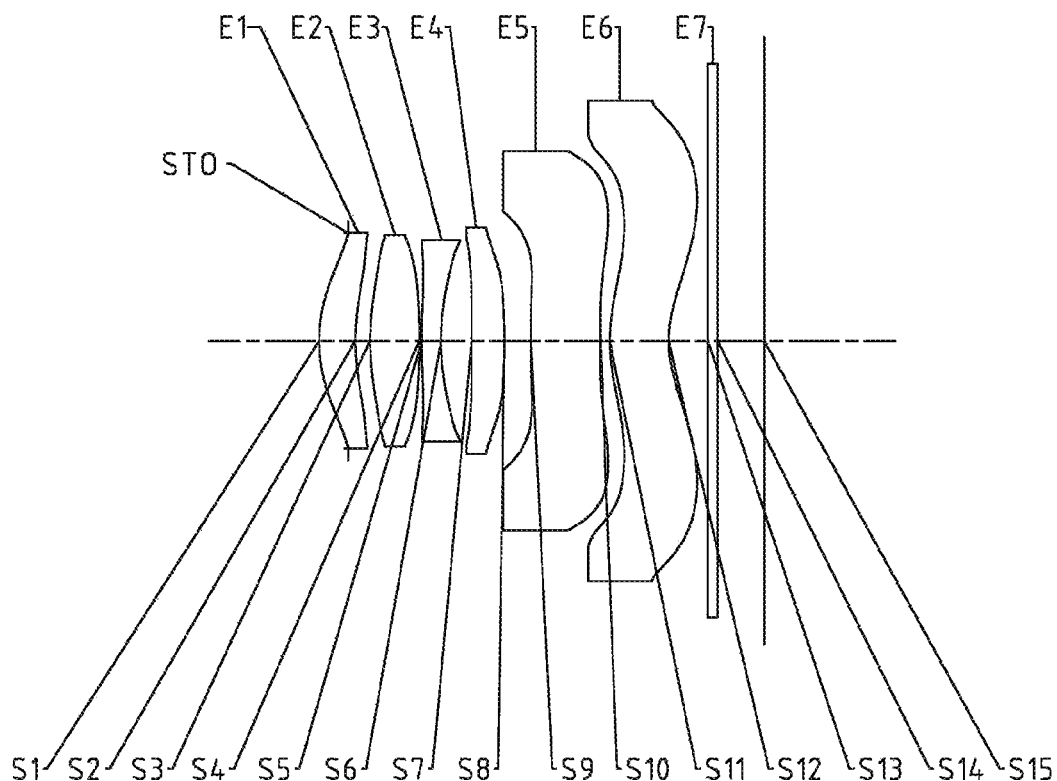
FIG. 8 illustrates a schematic structural view of a wide-angle lens group according to Example 3 of the present disclosure.

A wide-angle lens group according to example 3 of the present disclosure is described below with reference to FIG. 8 to FIG. 9D. FIG. 8 shows a schematic structural view of the wide-angle lens group according to example 3 of the present disclosure.

As shown in FIG. 8, the wide-angle lens group includes a stop STO, a wide-angle first lens E1, a wide-angle second lens E2, a wide-angle third lens E3, a wide-angle fourth lens E4, a wide-angle fifth lens E5, a wide-angle sixth lens E6, an optical filter E7 and an imaging plane S15, which are sequentially from an object side to an image side along an optical axis of the wide-angle lens group.

The wide-angle first lens E1 has a positive refractive power, an object-side surface S1 thereof is a convex surface, and an image-side surface S2 thereof is a concave surface. The wide-angle second lens E2 has a positive refractive power, an object-side surface S3 thereof is a convex surface, and an image-side surface S4 thereof is a convex surface. The wide-angle third lens E3 has a negative refractive power, an object-side surface S5 thereof is a convex surface, and an image-side surface S6 thereof is a concave surface. The wide-angle fourth lens E4 has a positive refractive power, an object-side surface S7 thereof is a convex surface, and an image-side surface S8 thereof is a convex surface. The wide-angle fifth lens E5 has a positive refractive power, an object-side surface S9 thereof is a concave surface, and an image-side surface S10 thereof is a convex surface. The wide-angle sixth lens E6 has a negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 5 shows a table of basic parameters of the wide-angle lens group in example 3, wherein the units for the radius of curvature, the thickness and the focal length are millimetre (mm).

TABLE 5

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | spherical | infinite | 1166.5500 | | | | |
| STO | spherical | infinite | −0.3675 | | | | |
| S1 | aspheric | 2.1543 | 0.4778 | 1.54 | 56.1 | 10.68 | −9.9987 |
| S2 | aspheric | 3.1467 | 0.1970 | | | | −5.8312 |
| S3 | aspheric | 3.8436 | 0.6498 | 1.54 | 56.1 | 5.16 | −7.4169 |
| S4 | aspheric | −9.9299 | 0.0330 | | | | 2.2405 |
| S5 | aspheric | 9.8047 | 0.2530 | 1.67 | 19.4 | −7.17 | −26.2678 |
| S6 | aspheric | 3.2176 | 0.4053 | | | | −7.8806 |
| S7 | aspheric | 45.7930 | 0.4334 | 1.58 | 28.4 | 14.43 | 8.0000 |
| S8 | aspheric | −10.3081 | 0.3516 | | | | −40.5127 |
| S9 | aspheric | −177.9960 | 0.9170 | 1.54 | 56.1 | 50.76 | 0.0000 |
| S10 | aspheric | −24.0436 | 0.1242 | | | | 0.0000 |
| S11 | aspheric | 2.4688 | 0.7778 | 1.54 | 55.7 | −10.98 | −2.3989 |

TABLE 5-continued

| Surface number | Surface type | Radius of curvature | Thickness/ Distance | Material Refractive index | Abbe number | Focal length | Conic coefficient |
|---|---|---|---|---|---|---|---|
| S12 | aspheric | 1.5489 | 0.5206 | | | | −5.0861 |
| S13 | spherical | infinite | 0.1283 | 1.52 | 64.2 | | |
| S14 | spherical | infinite | 0.6161 | | | | |
| S15 | spherical | infinite | | | | | |

In this example, a total effective focal length $f_B$ of the wide-angle lens group satisfies $f_B$=4.61 mm, a distance $TTL_B$ along the optical axis of the wide-angle lens group from the object-side surface S1 of the wide-angle first lens E1 to the imaging plane S15 satisfies $TTL_B$=5.88 mm, half of a diagonal length $ImgH_B$ of an effective pixel area on the imaging plane S15 satisfies $ImgH_B$=4.03 mm, half of a maximal field-of-view Semi-$FOV_B$ of the wide-angle lens group satisfies Semi-$FOV_B$=40.5°, and an ideal distance $P_B$ for the wide-angle lens group along the optical axis of the wide-angle lens group from the to-be-captured object to the object-side surface of the wide-angle first lens satisfies $P_B$=1167 mm.

In example 3, the object-side surface and the image-side surface of any one of the wide-angle first lens E1 to the wide-angle sixth lens E6 are aspheric. Table 6 below shows high-order coefficients A4, A6, A8, A10, A12, A14, A16, A18 and A20 applicable to each aspheric surface S1-S12 in example 3.

Figure 9A:
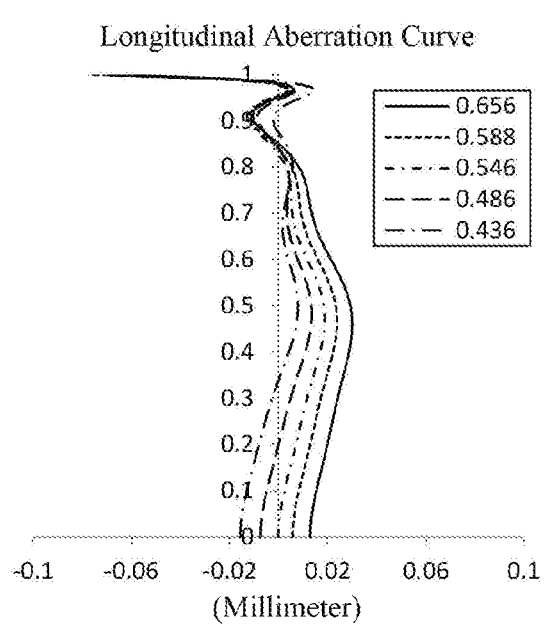
FIGS. 9A to 9D illustrate a longitudinal aberration curve, an astigmatic curve, a distortion curve and a lateral color curve of the wide-angle lens group of the Example 3, respectively.
Figure 9B:
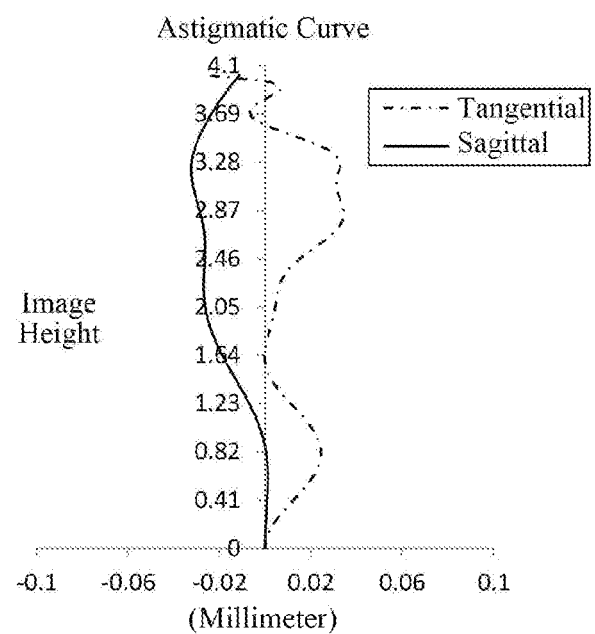
Figure 9C:
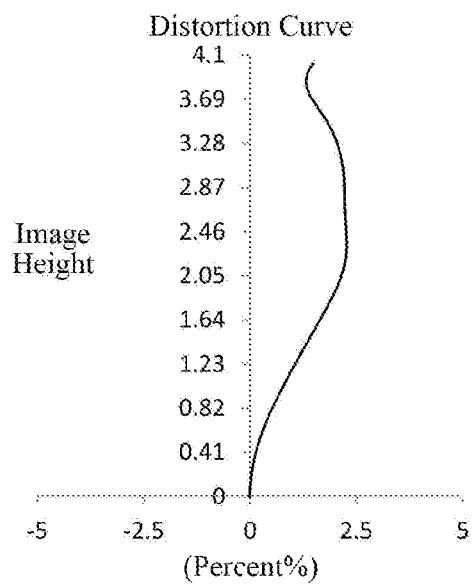
Figure 9D:
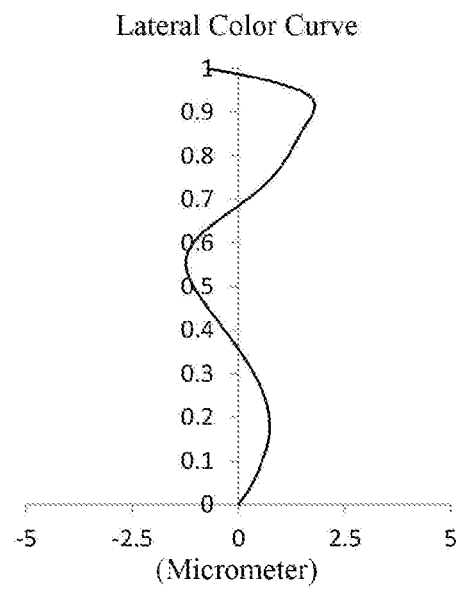

FIG. 9A illustrates a longitudinal aberration curve of the wide-angle lens group according to example 3, representing deviations of focal points converged by light of different wavelengths after passing through the lens assembly. FIG. 9B illustrates an astigmatic curve of the wide-angle lens group according to example 3, representing a curvature of a tangential plane and a curvature of a sagittal plane. FIG. 9C illustrates a distortion curve of the wide-angle lens group according to example 3, representing amounts of distortion at different image heights. FIG. 9D illustrates a lateral color curve of the wide-angle lens group according to example 3, representing deviations of different image heights on an imaging plane after light passes through the lens assembly. It can be seen from FIG. 9A to FIG. 9D that the wide-angle lens group provided in example 3 may achieve a good image quality.

EXAMPLE 4

Figure 10:
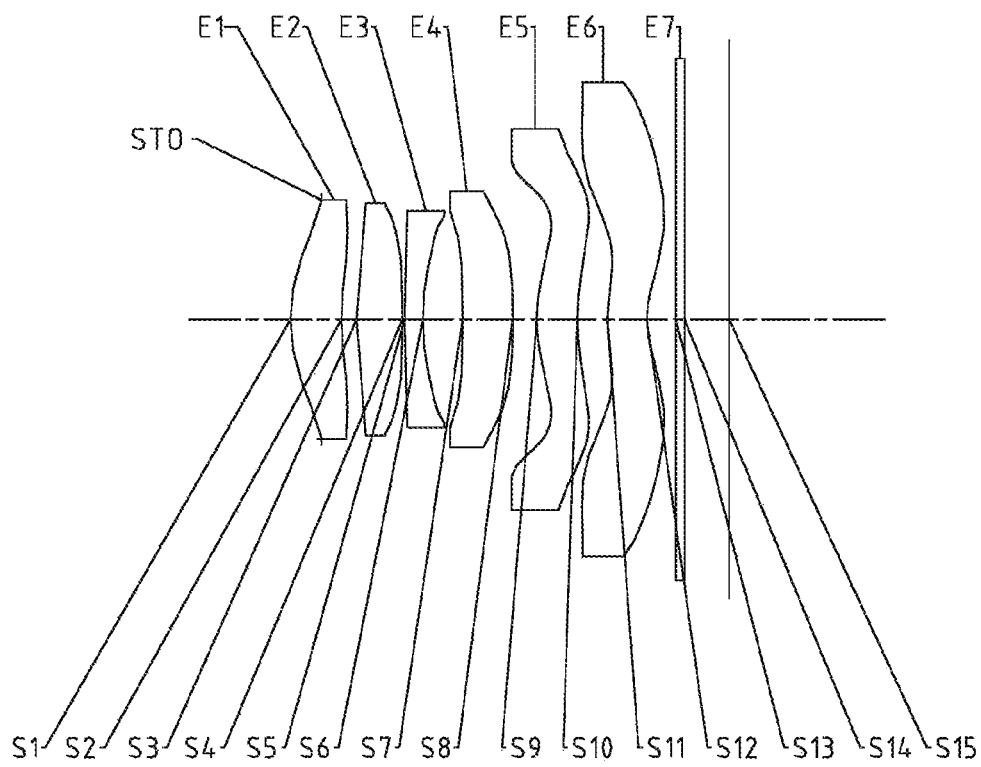
FIG. 10 illustrates a schematic structural view of a wide-angle lens group according to Example 4 of the present disclosure.

A wide-angle lens group according to example 4 of the present disclosure is described below with reference to FIG. 10 to FIG. 11D. FIG. 10 shows a schematic structural view of the wide-angle lens group according to example 4 of the present disclosure.

As shown in FIG. 10, the wide-angle lens group includes a stop STO, a wide-angle first lens E1, a wide-angle second lens E2, a wide-angle third lens E3, a wide-angle fourth lens E4, a wide-angle fifth lens E5, a wide-angle sixth lens E6, an optical filter E7 and an imaging plane S15, which are sequentially from an object side to an image side along an optical axis of the wide-angle lens group.

The wide-angle first lens E1 has a positive refractive power, an object-side surface S1 thereof is a convex surface,

TABLE 6

| Surface number | A4 | A6 | A8 | A10 | A12 | A14 | A16 | A18 |
|---|---|---|---|---|---|---|---|---|
| S1 | 1.0670E−01 | −1.0027E−01 | 7.5286E−02 | −4.5410E−02 | 1.4623E−02 | −1.8200E−03 | 0.0000E+00 | 0.0000E+00 |
| S2 | −8.6900E−03 | −1.9460E−02 | −8.9100E−03 | 1.1026E−02 | −2.0300E−03 | 0.0000E+00 | 0.0000E+00 | 0.0000E+00 |
| S3 | −2.8100E−03 | −1.1230E−02 | −1.7290E−02 | 2.2708E−02 | −5.9500E−03 | 0.0000E+00 | 0.0000E+00 | 0.0000E+00 |
| S4 | 7.4020E−03 | −4.0530E−02 | 3.8945E−02 | −2.7470E−02 | 1.0862E−02 | −1.8000E−03 | 0.0000E+00 | 0.0000E+00 |
| S5 | −3.8380E−02 | 3.5810E−03 | 3.4745E−02 | −5.3320E−02 | 2.8360E−02 | −4.8500E−03 | 0.0000E+00 | 0.0000E+00 |
| S6 | −3.1400E−02 | 4.7962E−02 | −3.2210E−02 | 1.3752E−02 | −5.9700E−03 | 2.0020E−03 | 0.0000E+00 | 0.0000E+00 |
| S7 | −1.7200E−02 | −4.4250E−02 | 5.6546E−02 | −3.0300E−02 | 8.8000E−03 | −1.7000E−03 | 1.9600E−04 | 0.0000E+00 |
| S8 | 1.8217E−02 | −1.3456E−01 | 1.3020E−01 | −7.2700E−02 | 2.7363E−02 | −6.2100E−03 | 6.3500E−04 | 0.0000E+00 |
| S9 | 1.4697E−01 | −2.4683E−01 | 1.4191E−01 | −4.7100E−02 | 8.6820E−03 | −8.2038E−04 | 2.9200E−05 | 6.1342E−07 |
| S10 | 1.7443E−01 | −1.3815E−01 | 5.3624E−02 | −1.2070E−02 | 1.5740E−03 | −1.2074E−04 | 5.3900E−06 | −1.2952E−07 |
| S11 | −9.6820E−02 | 1.3381E−02 | 2.0203E−02 | −2.0260E−02 | 9.0400E−03 | −2.2151E−03 | 3.0100E−04 | −2.0965E−05 |
| S12 | −5.2270E−02 | 1.3705E−02 | −1.4300E−03 | −8.2000E−04 | 3.7000E−04 | −6.6744E−05 | 6.1700E−06 | −2.8490E−07 |

| Surface number | A20 |
|---|---|
| S1 | 0.0000E+00 |
| S2 | 0.0000E+00 |
| S3 | 0.0000E+00 |
| S4 | 0.0000E+00 |
| S5 | 0.0000E+00 |
| S6 | 0.0000E+00 |
| S7 | 0.0000E+00 |
| S8 | 0.0000E+00 |
| S9 | −4.9918E−08 |
| S10 | 1.2976E−09 |
| S11 | 5.7625E−07 |
| S12 | 5.1849E−09 | and an image-side surface S2 thereof is a concave surface. The wide-angle second lens E2 has a positive refractive power, an object-side surface S3 thereof is a convex surface, and an image-side surface S4 thereof is a convex surface. The wide-angle third lens E3 has a negative refractive power, an object-side surface S5 thereof is a convex surface, and an image-side surface S6 thereof is a concave surface. The wide-angle fourth lens E4 has a negative refractive power, an object-side surface S7 thereof is a concave surface, and an image-side surface S8 thereof is a convex surface. The wide-angle fifth lens E5 has a positive refractive power, an object-side surface S9 thereof is a convex surface, and an image-side surface S10 thereof is a concave surface. The wide-angle sixth lens E6 has a negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 7 shows a table of basic parameters of the wide-angle lens group in example 4, wherein the units for the radius of curvature, the thickness and the focal length are millimetre (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | 1175.8820 | | | | |
| STO | spherical | infinite | −0.4184 | | | | |
| S1 | aspheric | 2.4375 | 0.7092 | 1.57 | 61.8 | 9.83 | −11.0337 |
| S2 | aspheric | 3.8713 | 0.2103 | | | | −10.0974 |
| S3 | aspheric | 4.0020 | 0.6365 | 1.54 | 56.1 | 6.27 | −24.1958 |
| S4 | aspheric | −22.2421 | 0.0330 | | | | −68.0044 |
| S5 | aspheric | 8.1544 | 0.2530 | 1.67 | 19.4 | −8.88 | −60.0921 |
| S6 | aspheric | 3.4149 | 0.5530 | | | | −6.2920 |
| S7 | aspheric | −48.7489 | 0.6963 | 1.73 | 38.9 | −905.46 | −27.2177 |
| S8 | aspheric | −52.9433 | 0.3369 | | | | 8.0000 |
| S9 | aspheric | 2.3729 | 0.5665 | 1.54 | 56.1 | 11.32 | 0.0000 |
| S10 | aspheric | 3.5264 | 0.4163 | | | | 0.0000 |
| S11 | aspheric | 2.0783 | 0.5485 | 1.54 | 55.7 | −10.39 | −0.6531 |
| S12 | aspheric | 1.3744 | 0.4035 | | | | −3.7621 |
| S13 | spherical | infinite | 0.1210 | 1.52 | 64.2 | | |
| S14 | spherical | infinite | 0.6210 | | | | |
| S15 | spherical | infinite | | | | | |

In this example, a total effective focal length $f_B$ of the wide-angle lens group satisfies $f_B$=4.73 mm, a distance $TTL_B$ along the optical axis of the wide-angle lens group from the object-side surface S1 of the wide-angle first lens E1 to the imaging plane S15 satisfies $TTL_B$=6.10 mm, half of a diagonal length $ImgH_B$ of an effective pixel area on the imaging plane S15 satisfies $ImgH_B$=3.91 mm, half of a maximal field-of-view Semi-$FOV_B$ of the wide-angle lens group satisfies Semi-$FOV_B$=39.1°, and an ideal distance $P_B$ for the wide-angle lens group along the optical axis of the wide-angle lens group from the to-be-captured object to the object-side surface of the wide-angle first lens satisfies $P_B$=1176 mm.

In example 4, the object-side surface and the image-side surface of any one of the wide-angle first lens E1 to the wide-angle sixth lens E6 are aspheric. Table 8 below shows high-order coefficients A4, A6, A8, A10, A12, A14, A16, A18 and A20 applicable to each aspheric surface S1-S12 in example 4.

TABLE 8

| Surface number | A4 | A6 | A8 | A10 | A12 | A14 | A16 | A18 |
|---|---|---|---|---|---|---|---|---|
| S1 | 8.0647E−02 | −6.2860E−02 | 3.7813E−02 | −1.6710E−02 | 3.7472E−03 | −3.0845E−04 | 0.0000E+00 | 0.0000E+00 |
| S2 | −2.5370E−02 | −1.2290E−02 | −8.8443E−05 | 4.8510E−03 | −1.9732E−03 | 2.8750E−04 | 0.0000E+00 | 0.0000E+00 |
| S3 | 3.3620E−03 | −3.3000E−02 | 6.6320E−03 | 9.7940E−03 | −4.8160E−03 | 6.2339E−04 | 0.0000E+00 | 0.0000E+00 |
| S4 | 2.3566E−02 | −9.2300E−02 | 7.6472E−02 | −3.3810E−02 | 7.6956E−03 | −7.1581E−04 | 0.0000E+00 | 0.0000E+00 |
| S5 | 1.9840E−02 | −6.9960E−02 | 5.0024E−02 | −2.1930E−02 | 6.5258E−03 | −8.0972E−04 | 0.0000E+00 | 0.0000E+00 |
| S6 | −4.5900E−03 | 1.1107E−02 | −2.5961E−02 | 2.1106E−02 | −7.3880E−03 | 1.2471E−03 | 0.0000E+00 | 0.0000E+00 |
| S7 | −3.3520E−02 | 1.9847E−02 | −2.4186E−02 | 1.9524E−02 | −1.1149E−02 | 3.4337E−03 | −4.0000E−04 | 0.0000E+00 |
| S8 | −7.7610E−02 | 3.0816E−02 | −1.5553E−02 | 7.0690E−03 | −2.4930E−03 | 5.2021E−04 | −4.0000E−05 | 0.0000E+00 |
| S9 | −9.0050E−02 | 3.8040E−03 | 1.4950E−02 | −4.7670E−02 | 4.6048E−02 | −2.3650E−02 | 6.6830E−03 | −9.6000E−04 |
| S10 | −8.2130E−02 | 1.0099E−01 | −1.1885E−01 | 7.6254E−02 | −3.0789E−02 | 7.9370E−03 | −1.2500E−03 | 1.0900E−04 |

TABLE 8-continued

| S11 | −3.9885E−01 | 2.0695E−01 | −9.4230E−02 | 3.7231E−02 | −1.0412E−02 | 1.8680E−03 | −2.0000E−04 | 1.2300E−05 |
| S12 | −1.8273E−01 | 1.0102E−01 | −4.1860E−02 | 1.2003E−02 | −2.2094E−03 | 2.4900E−04 | −1.6000E−05 | 5.1500E−07 |

| Surface number | A20 |
| --- | --- |
| S1 | 0.0000E+00 |
| S2 | 0.0000E+00 |
| S3 | 0.0000E+00 |
| S4 | 0.0000E+00 |
| S5 | 0.0000E+00 |
| S6 | 0.0000E+00 |
| S7 | 0.0000E+00 |
| S8 | 0.0000E+00 |
| S9 | 5.4802E−05 |
| S10 | −3.9776E−06 |
| S11 | −3.1715E−07 |
| S12 | −5.3624E−09 |

Figure 11A:
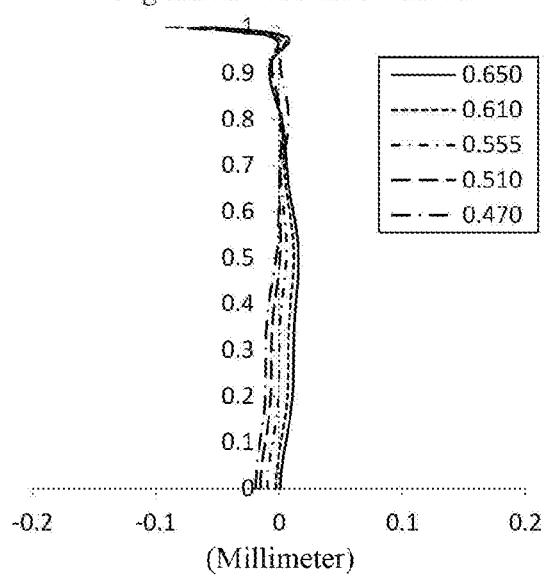
FIGS. 11A to 11D illustrate a longitudinal aberration curve, an astigmatic curve, a distortion curve and a lateral color curve of the wide-angle lens group of the Example 4, respectively.
Figure 11B:
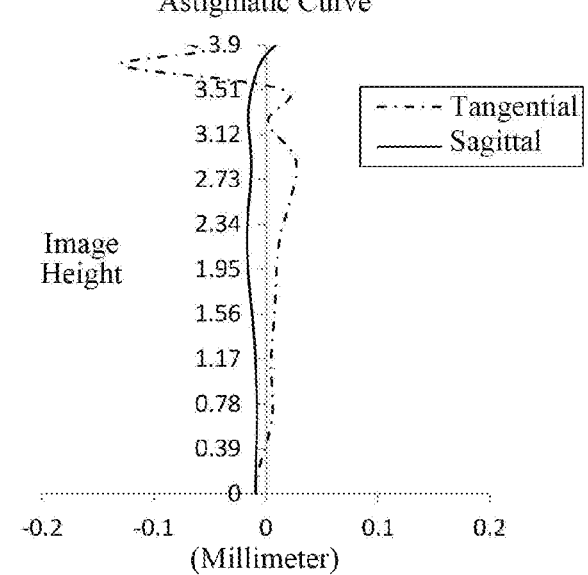
Figure 11C:
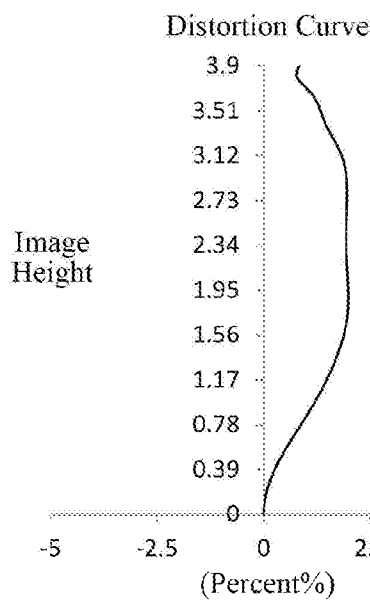
Figure 11D:
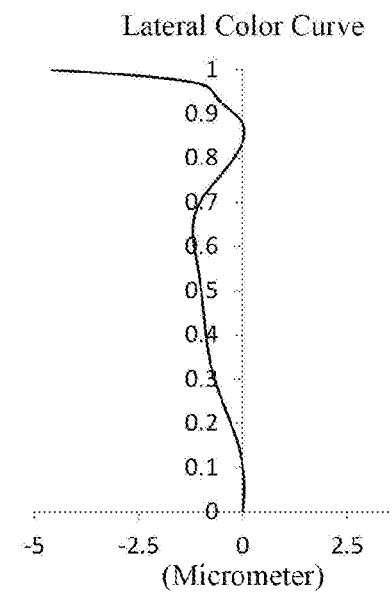

FIG. 11A illustrates a longitudinal aberration curve of the wide-angle lens group according to example 4, representing deviations of focal points converged by light of different wavelengths after passing through the lens assembly. FIG. 11B illustrates an astigmatic curve of the wide-angle lens group according to example 4, representing a curvature of a tangential plane and a curvature of a sagittal plane. FIG. 11C illustrates a distortion curve of the wide-angle lens group according to example 4, representing amounts of distortion at image heights. FIG. 11D illustrates a lateral color curve of the wide-angle lens group according to example 4, representing deviations of different image heights on an imaging plane after light passes through the lens assembly. It can be seen from FIG. 11A to FIG. 11D that the wide-angle lens group provided in example 4 may achieve a good image quality.

EXAMPLE 5

Figure 12:
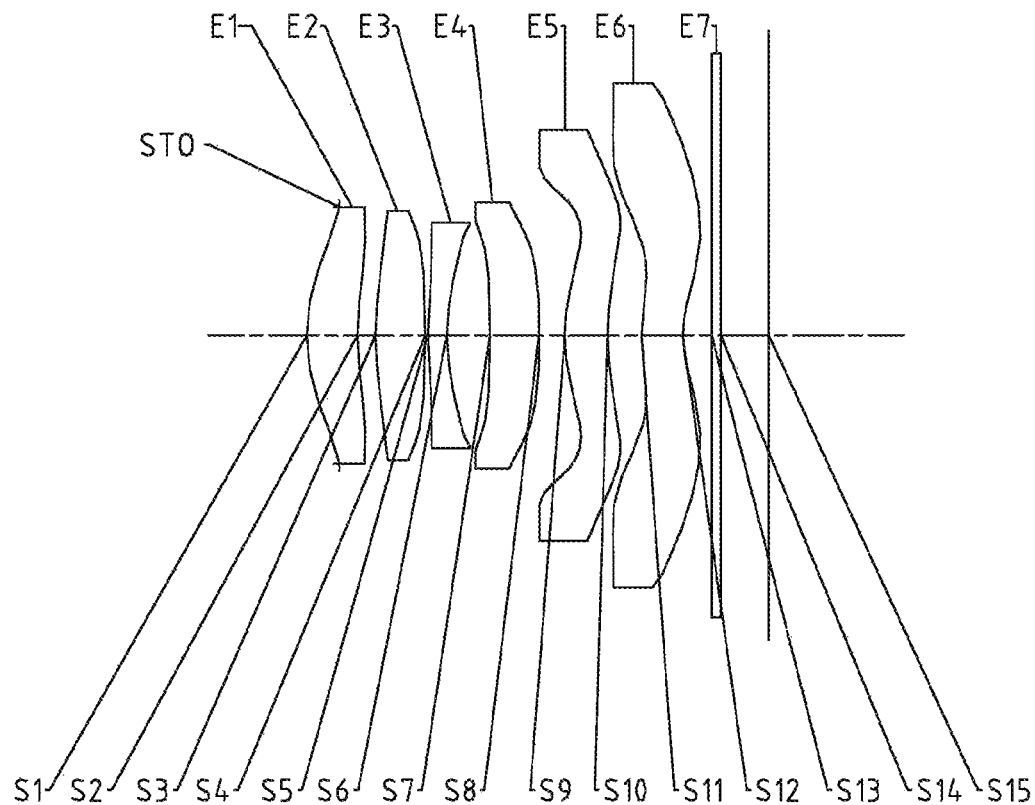
FIG. 12 illustrates a schematic structural view of a wide-angle lens group according to Example 5 of the present disclosure.

A wide-angle lens group according to example 5 of the present disclosure is described below with reference to FIG. 12 to FIG. 13D. FIG. 12 shows a schematic structural view of the wide-angle lens group according to example 5 of the present disclosure.

As shown in FIG. 12, the wide-angle lens group includes a stop STO, a wide-angle first lens E1, a wide-angle second lens E2, a wide-angle third lens E3, a wide-angle fourth lens E4, a wide-angle fifth lens E5, a wide-angle sixth lens E6, an optical filter E7 and an imaging plane S15, which are sequentially from an object side to an image side along an optical axis of the wide-angle lens group.

The wide-angle first lens E1 has a positive refractive power, an object-side surface S1 thereof is a convex surface, and an image-side surface S2 thereof is a concave surface. The wide-angle second lens E2 has a positive refractive power, an object-side surface S3 thereof is a convex surface, and an image-side surface S4 thereof is a convex surface. The wide-angle third lens E3 has a negative refractive power, an object-side surface S5 thereof is a convex surface, and an image-side surface S6 thereof is a concave surface. The wide-angle fourth lens E4 has a negative refractive power, an object-side surface S7 thereof is a concave surface, and an image-side surface S8 thereof is a convex surface. The wide-angle fifth lens E5 has a positive refractive power, an object-side surface S9 thereof is a convex surface, and an image-side surface S10 thereof is a concave surface. The wide-angle sixth lens E6 has a negative refractive power, an object-side surface S11 thereof is a convex surface, and an image-side surface S12 thereof is a concave surface. The optical filter E7 has an object-side surface S13 and an image-side surface S14. Light from an object sequentially passes through the respective surfaces S1 to S14 and is finally imaged on the imaging plane S15.

Table 9 shows a table of basic parameters of the wide-angle lens group in example 5, wherein the units for the radius of curvature, the thickness and the focal length are millimetre (mm).

TABLE 9

| Surface number | Surface type | Radius of curvature | Thickness/ Distance | Material Refractive index | Abbe number | Focal length | Conic coefficient |
| --- | --- | --- | --- | --- | --- | --- | --- |
| OBJ | spherical | infinite | 1253.9180 | | | | |
| STO | spherical | infinite | −0.4334 | | | | |
| S1 | aspheric | 2.5939 | 0.6990 | 1.59 | 61.0 | 10.43 | −11.3261 |
| S2 | aspheric | 4.0272 | 0.2509 | | | | −8.0149 |
| S3 | aspheric | 4.5129 | 0.6859 | 1.54 | 56.1 | 7.08 | −18.6059 |
| S4 | aspheric | −25.4077 | 0.0345 | | | | −49.7083 |
| S5 | aspheric | 5.4978 | 0.2645 | 1.67 | 18.5 | −10.45 | −46.0113 |
| S6 | aspheric | 3.0323 | 0.5928 | | | | −7.5334 |
| S7 | aspheric | −52.7027 | 0.6803 | 1.72 | 37.5 | −275.05 | −68.8310 |
| S8 | aspheric | −72.0265 | 0.3566 | | | | −68.9000 |
| S9 | aspheric | 2.4779 | 0.5923 | 1.54 | 56.1 | 11.04 | 0.0000 |
| S10 | aspheric | 3.8526 | 0.4667 | | | | 0.0000 |
| S11 | aspheric | 2.2246 | 0.5704 | 1.54 | 55.7 | −10.91 | −0.6464 |
| S12 | aspheric | 1.4676 | 0.4000 | | | | −3.5473 |
| S13 | spherical | infinite | 0.1265 | 1.52 | 64.2 | | |

TABLE 9-continued

| Surface number | Surface type | Radius of curvature | Thickness/ Distance | Material Refractive index | Abbe number | Focal length | Conic coefficient |
|---|---|---|---|---|---|---|---|
| S14 | spherical | infinite | 0.6622 | | | | |
| S15 | spherical | infinite | | | | | |

In this example, a total effective focal length $f_B$ of the wide-angle lens group satisfies $f_B$=4.94 mm, a distance $TTL_B$ along the optical axis of the wide-angle lens group from the object-side surface S1 of the wide-angle first lens E1 to the imaging plane S15 satisfies $TTL_B$=6.38 mm, half of a diagonal length $ImgH_B$ of an effective pixel area on the imaging plane S15 satisfies $ImgH_B$=4.26 mm, half of a maximal field-of-view Semi-$FOV_B$ of the wide-angle lens group satisfies Semi-$FOV_B$=39.9°, and an ideal distance $P_B$ for the wide-angle lens group along the optical axis of the wide-angle lens group from the to-be-captured object to the object-side surface of the wide-angle first lens satisfies $P_B$=1254 mm.

In example 5, the object-side surface and the image-side surface of any one of the wide-angle first lens E1 to the wide-angle sixth lens E6 are aspheric. Table 10 below shows high-order coefficients A4, A6, A8, A10, A12, A14, A16, A18 and A20 applicable to each aspheric surface S1-S12 in example 5.

TABLE 10

| Surface number | A4 | A6 | A8 | A10 | A12 | A14 | A16 | A18 |
|---|---|---|---|---|---|---|---|---|
| S1  |  6.8870E−02 | −4.8779E−02 |  2.6230E−02 | −1.0390E−02 |  2.1140E−03 | −1.6005E−04 |  0.0000E+00 |  0.0000E+00 |
| S2  | −1.5750E−02 | −9.4718E−03 | −4.6000E−04 |  2.2950E−03 | −6.8000E−04 |  7.8794E−05 |  0.0000E+00 |  0.0000E+00 |
| S3  | −3.2000E−04 | −1.2041E−02 | −5.6500E−03 |  9.0300E−03 | −2.8700E−03 |  2.8514E−04 |  0.0000E+00 |  0.0000E+00 |
| S4  |  1.8791E−02 | −6.3938E−02 |  4.7068E−02 | −1.8540E−02 |  3.7860E−03 | −3.1759E−04 |  0.0000E+00 |  0.0000E+00 |
| S5  |  2.2335E−02 | −6.6118E−02 |  4.6230E−02 | −1.9720E−02 |  5.1970E−03 | −5.5887E−04 |  0.0000E+00 |  0.0000E+00 |
| S6  | −1.3300E−03 |  4.6790E−04 | −1.0280E−02 |  9.1900E−03 | −3.3300E−03 |  5.7826E−04 |  0.0000E+00 |  0.0000E+00 |
| S7  | −3.0830E−02 |  1.5710E−02 | −1.6480E−02 |  1.1324E−02 | −5.4700E−03 |  1.3359E−03 | −1.1000E−04 |  0.0000E+00 |
| S8  | −7.0210E−02 |  2.6625E−02 | −1.4220E−02 |  6.7740E−03 | −2.2900E−03 |  4.2501E−04 | −2.7000E−05 |  0.0000E+00 |
| S9  | −8.8950E−02 |  1.2400E−03 |  2.4259E−02 | −6.0820E−02 |  5.4631E−02 | −2.6450E−02 |  7.1090E−03 | −9.8000E−04 |
| S10 | −7.8880E−02 |  1.1084E−01 | −1.3093E−01 |  8.2522E−02 | −3.2439E−02 |  8.1020E−03 | −1.2300E−03 |  1.0300E−04 |
| S11 | −4.0903E−01 |  2.1433E−01 | −9.8964E−02 |  3.8497E−02 | −1.0430E−02 |  1.8110E−03 | −1.9000E−04 |  1.1300E−05 |
| S12 | −2.0161E−01 |  1.1225E−01 | −4.6160E−02 |  1.2727E−02 | −2.1724E−03 |  2.1300E−04 | −1.0000E−05 |  9.4400E−08 |

| Surface number | A20 |
|---|---|
| S1 | 0.0000E+00 |
| S2 | 0.0000E+00 |
| S3 | 0.0000E+00 |
| S4 | 0.0000E+00 |
| S5 | 0.0000E+00 |
| S6 | 0.0000E+00 |
| S7 | 0.0000E+00 |
| S8 | 0.0000E+00 |
| S9 | 5.4201E−05 |
| S10 | −3.6507E−06 |
| S11 | −2.8458E−07 |
| S12 | 6.2030E−09 |

Figure 13A:
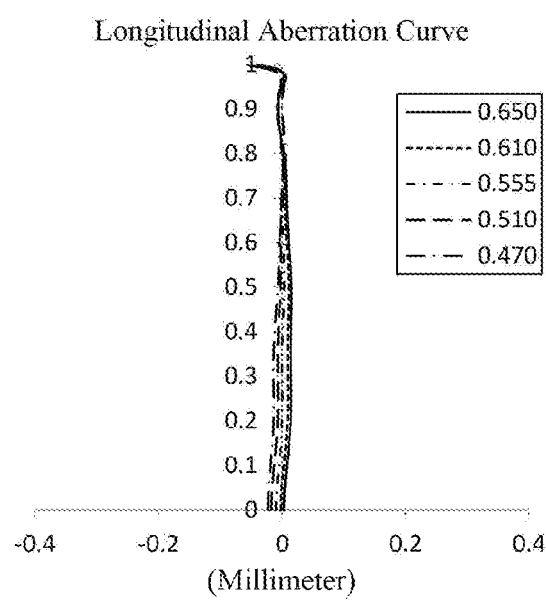
FIGS. 13A to 13D illustrate a longitudinal aberration curve, an astigmatic curve, a distortion curve and a lateral color curve of the wide-angle lens group of the Example 5, respectively.
Figure 13B:
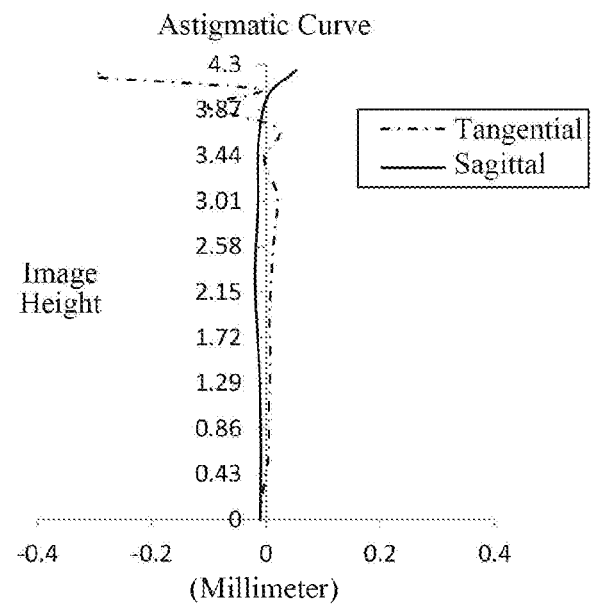
Figure 13C:
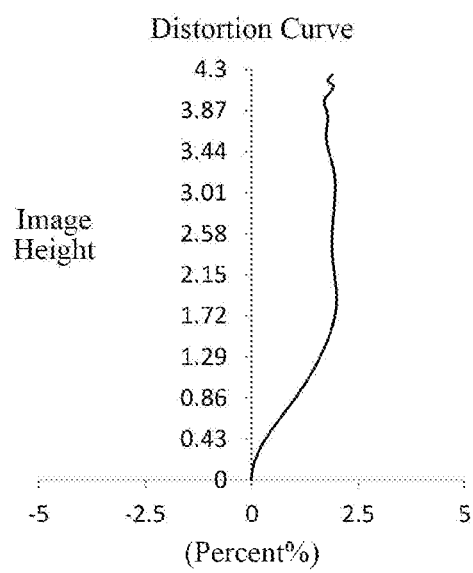
Figure 13D:
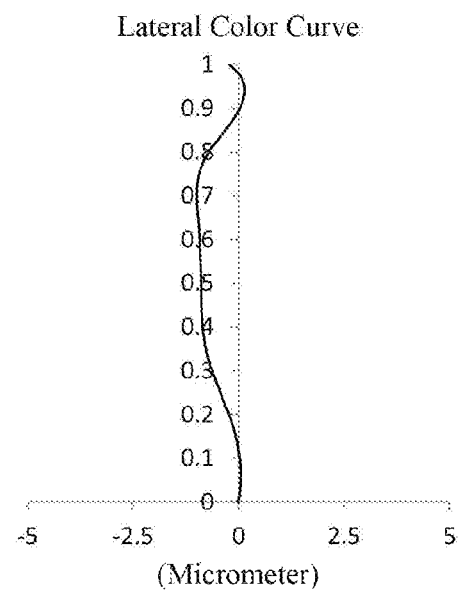

FIG. 13A illustrates a longitudinal aberration curve of the wide-angle lens group according to example 5, representing deviations of focal points converged by light of different wavelengths after passing through the lens assembly. FIG. 13B illustrates an astigmatic curve of the wide-angle lens group according to example 5, representing a curvature of a tangential plane and a curvature of a sagittal plane. FIG. 13C illustrates a distortion curve of the wide-angle lens group according to example 5, representing amounts of distortion at different image heights. FIG. 13D illustrates a lateral color curve of the wide-angle lens group according to example 5, representing deviations of different image heights on an imaging plane after light passes through the lens assembly. It can be seen from FIG. 13A to FIG. 13D that the wide-angle lens group provided in example 5 may achieve a good image quality.

EXAMPLE 6

A telephoto lens group according to example 6 of the present disclosure is described below with reference to FIG. 14 to FIG. 15D. FIG. 14 shows a schematic structural view of the telephoto lens group according to example 6 of the present disclosure.

As shown in FIG. 14, the telephoto lens group includes a stop STO, a telephoto first lens E1, a telephoto second lens E2, a stop ST1, a telephoto third lens E3, a telephoto fourth lens E4, a telephoto fifth lens E5, a telephoto sixth lens E6, an optical filter E7 and an imaging plane S15, which are sequentially from an object side to an image side along an optical axis of the telephoto lens group.

The telephoto first lens E1 has a positive refractive power, an object-side surface S1 thereof is a convex surface, and an image-side surface S2 thereof is a concave surface. The telephoto second lens E2 has a negative refractive power, an object-side surface S3 thereof is a convex surface, and an image-side surface S4 thereof is a concave surface. The telephoto third lens E3 has a negative refractive power, an object-side surface S5 thereof is a convex surface, and an image-side surface S6 thereof is a concave surface. The telephoto fourth lens E4 has a negative refractive power, an object-side surface S7 thereof is a convex surface, and an image-side surface S8 thereof is a concave surface. The telephoto fifth lens E5 has a negative refractive power, an object-side surface S9 thereof is a concave surface, and an image-side surface S10 thereof is a concave surface. The telephoto sixth lens E6 has a positive refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S1 to S14 and is finally imaged on the imaging plane S15.

Table 11 shows a table of basic parameters of the telephoto lens group in example 6, wherein the units for the radius of curvature, the thickness and the focal length are millimetre (mm).

TABLE 11

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | −0.8368 | | | | |
| S1 | aspheric | 1.6517 | 1.0617 | 1.55 | 56.1 | 3.40 | −0.1592 |
| S2 | aspheric | 11.5418 | 0.1594 | | | | −4.6173 |
| S3 | aspheric | 6.9318 | 0.2591 | 1.68 | 19.2 | −6.44 | 21.3006 |
| S4 | aspheric | 2.6385 | 0.3681 | | | | 3.5073 |
| ST1 | spherical | infinite | 0.1502 | | | | |
| S5 | aspheric | 13.2028 | 0.2394 | 1.68 | 19.2 | −85.92 | 38.1963 |
| S6 | aspheric | 10.6834 | 0.3078 | | | | 9.5695 |
| S7 | aspheric | 12.4150 | 0.2310 | 1.55 | 56.1 | −29.78 | 99.0000 |
| S8 | aspheric | 6.9931 | 1.1550 | | | | 18.2215 |
| S9 | aspheric | −14.3858 | 0.2345 | 1.55 | 56.1 | −7.23 | 98.5705 |
| S10 | aspheric | 5.4704 | 0.6481 | | | | −33.8270 |
| S11 | aspheric | −6.6398 | 1.1031 | 1.67 | 20.3 | 40.04 | −99.0000 |
| S12 | aspheric | −5.6702 | 0.0330 | | | | −10.0000 |
| S13 | spherical | infinite | 0.2310 | 1.52 | 64.2 | | |
| S14 | spherical | infinite | 0.1427 | | | | |
| S15 | spherical | infinite | | | | | |

In this example, a total effective focal length $f_C$ of the telephoto lens group satisfies $f_C=7.43$ mm, a distance $TTL_C$ along the optical axis of the telephoto lens group from the object-side surface S1 of the telephoto first lens E1 to the imaging plane S15 satisfies $TTL_C=6.32$ mm, half of a diagonal length $ImgH_C$ of an effective pixel area on the imaging plane S15 satisfies $ImgH_C=2.94$ mm, half of a maximal field-of-view Semi-$FOV_C$ of the telephoto lens group satisfies Semi-$FOV_C=21.3°$, and an ideal distance $P_C$ for the telephoto lens group along the optical axis of the telephoto lens group from the to-be-captured object to the object-side surface of the telephoto first lens is infinite.

In example 6, the object-side surface and the image-side surface of any one of the telephoto first lens E1 to the telephoto sixth lens E6 are aspheric. Table 12 below shows high-order coefficients A4, A6, A8, A10, A12, A14, A16, A18 and A20 applicable to each aspheric surface S1-S12 in example 6.

TABLE 12

| Surface number | A4 | A6 | A8 | A10 | A12 | A14 | A16 | A18 |
|---|---|---|---|---|---|---|---|---|
| S1 | 7.1280E−03 | −1.3830E−02 | 7.2394E−02 | −1.8821E−01 | 2.9662E−01 | −2.8181E−01 | 1.5698E−01 | −4.6520E−02 |
| S2 | 1.4257E−02 | 1.4111E−02 | 1.0861E−02 | −4.1580E−02 | −7.1000E−03 | 1.0712E−01 | −1.4071E−01 | 7.4928E−02 |
| S3 | −5.0160E−02 | 1.8250E−01 | −4.0299E−01 | 1.3191E+00 | −3.1820E+00 | 4.7219E+00 | −4.1593E+00 | 1.9829E+00 |
| S4 | −8.4600E−02 | 4.6940E−01 | −2.5096E+00 | 1.1762E+01 | −3.2100E+01 | 5.0614E+01 | −4.2487E+01 | 1.4579E+01 |
| S5 | −4.6630E−02 | 1.1486E−01 | −3.1135E−01 | 2.4017E+00 | −7.0423E+00 | 1.1510E+01 | −1.0914E+01 | 5.2472E+00 |
| S6 | 3.6150E−02 | −1.4923E−01 | 1.0344E+00 | −3.0872E+00 | 8.9625E+00 | −1.8553E+01 | 2.4355E+01 | −1.8586E+01 |
| S7 | 8.4736E−02 | −5.5330E−01 | 1.4356E+00 | −2.9156E+00 | 5.3994E+00 | −6.7599E+00 | 5.1967E+00 | −2.3355E+00 |
| S8 | 6.7447E−02 | −3.1630E−01 | 3.0115E−01 | 3.3796E−01 | −1.0818E+00 | 1.1412E+00 | −3.2748E−01 | −2.5001E−01 |
| S9 | −1.6837E−01 | 1.8022E−01 | −4.9957E−01 | 6.9773E−01 | −6.8255E−01 | 4.5534E−01 | −1.9817E−01 | 5.2038E−02 |
| S10 | −1.0975E−01 | 1.6656E−01 | −3.1861E−01 | 3.1987E−01 | −1.9310E−01 | 6.9838E−02 | −1.3790E−02 | 1.1050E−03 |
| S11 | −6.7760E−02 | 1.0183E−01 | −8.1330E−02 | 4.1353E−02 | −1.4010E−02 | 3.1560E−03 | −4.5000E−04 | 3.7100E−05 |
| S12 | −7.2210E−02 | 3.9748E−02 | −2.2310E−02 | 7.5070E−03 | −8.0000E−04 | −2.3000E−04 | 8.1600E−05 | −9.7000E−06 |

TABLE 12-continued

| Surface number | A20 |
|---|---|
| S1 | 5.4710E−03 |
| S2 | −1.4500E−02 |
| S3 | −3.9038E−01 |
| S4 | 2.5965E−01 |
| S5 | −8.4216E−01 |
| S6 | 6.1993E+00 |
| S7 | 4.7866E−01 |
| S8 | 1.3650E−01 |
| S9 | −6.2000E−03 |
| S10 | 7.5500E−06 |
| S11 | −1.3000E−06 |
| S12 | 4.1500E−07 |

Figure 15C:
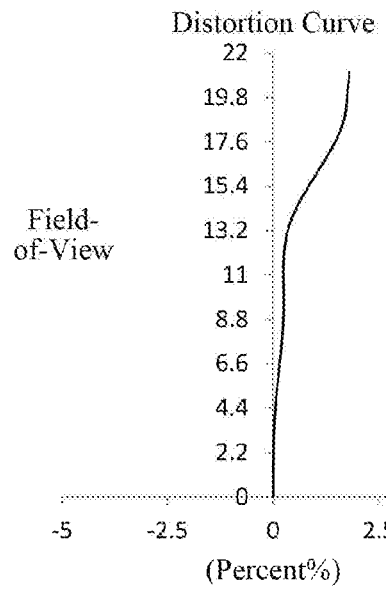
Figure 15D:
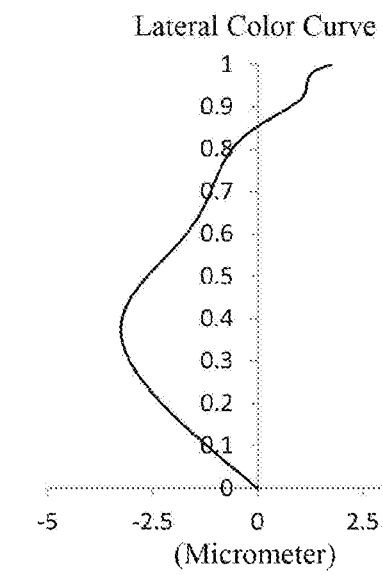

FIG. 15A illustrates a longitudinal aberration curve of the telephoto lens group according to example 6, representing deviations of focal points converged by light of different wavelengths after passing through the lens assembly. FIG. 15B illustrates an astigmatic curve of the telephoto lens group according to example 6, representing a curvature of a tangential plane and a curvature of a sagittal plane. FIG. 15C illustrates a distortion curve of the telephoto lens group according to example 6, representing amounts of distortion at different field-of-views. FIG. 15D illustrates a lateral color curve of the telephoto lens group according to example 6, representing deviations of different image heights on an imaging plane after light passes through the lens assembly. It can be seen from FIG. 15A to FIG. 15D that the telephoto lens group provided in example 6 may achieve a good image quality.

EXAMPLE 7

Figure 16:
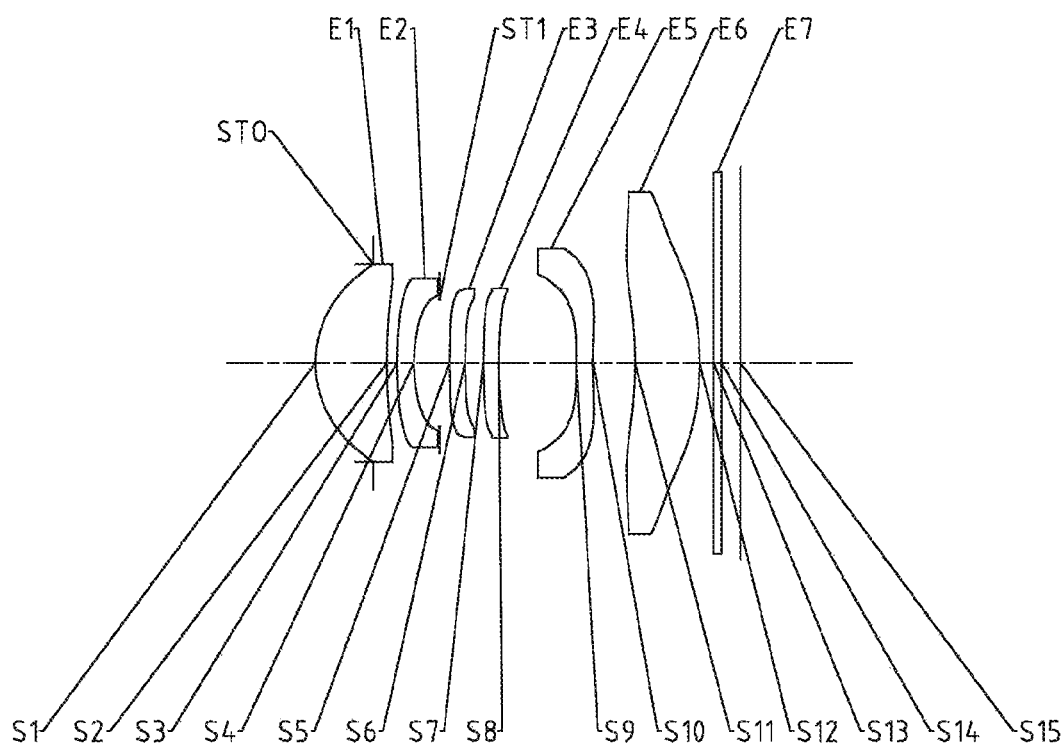
FIG. 16 illustrates a schematic structural view of a telephoto lens group according to Example 7 of the present disclosure.

A telephoto lens group according to example 7 of the present disclosure is described below with reference to FIG. 16 to FIG. 17D. FIG. 16 shows a schematic structural view of the telephoto lens group according to example 7 of the present disclosure.

As shown in FIG. 16, the telephoto lens group includes a stop STO, a telephoto first lens E1, a telephoto second lens E2, a stop ST1, a telephoto third lens E3, a telephoto fourth lens E4, a telephoto fifth lens E5, a telephoto sixth lens E6, an optical filter E7 and an imaging plane S15, which are sequentially from an object side to an image side along an optical axis of the telephoto lens group.

The telephoto first lens E1 has a positive refractive power, an object-side surface S1 thereof is a convex surface, and an image-side surface S2 thereof is a concave surface. The telephoto second lens E2 has a negative refractive power, an object-side surface S3 thereof is a convex surface, and an image-side surface S4 thereof is a concave surface. The telephoto third lens E3 has a negative refractive power, an object-side surface S5 thereof is a convex surface, and an image-side surface S6 thereof is a concave surface. The telephoto fourth lens E4 has a negative refractive power, an object-side surface S7 thereof is a convex surface, and an image-side surface S8 thereof is a concave surface. The telephoto fifth lens E5 has a negative refractive power, an object-side surface S9 thereof is a concave surface, and an image-side surface S10 thereof is a concave surface. The telephoto sixth lens E6 has a positive refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S1 to S14 and is finally imaged on the imaging plane S15.

Table 13 shows a table of basic parameters of the telephoto lens group in example 7, wherein the units for the radius of curvature, the thickness and the focal length are millimetre (mm).

TABLE 13

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | −0.8597 | | | | |
| S1 | aspheric | 1.6516 | 1.0671 | 1.55 | 56.1 | 3.39 | −0.1559 |
| S2 | aspheric | 11.9191 | 0.1506 | | | | −3.1082 |
| S3 | aspheric | 6.9733 | 0.2494 | 1.68 | 19.2 | −6.49 | 22.0500 |
| S4 | aspheric | 2.6587 | 0.3806 | | | | 3.5367 |
| ST1 | spherical | infinite | 0.1502 | | | | |
| S5 | aspheric | 13.6454 | 0.2310 | 1.68 | 19.2 | −59.72 | 40.1001 |
| S6 | aspheric | 10.1344 | 0.2700 | | | | 29.6560 |
| S7 | aspheric | 11.5653 | 0.2310 | 1.55 | 56.1 | −26.68 | 97.4207 |
| S8 | aspheric | 6.4013 | 1.1550 | | | | 21.3064 |
| S9 | aspheric | −13.3384 | 0.2420 | 1.55 | 56.1 | −7.91 | 88.8797 |
| S10 | aspheric | 6.4297 | 0.6319 | | | | −35.3102 |
| S11 | aspheric | −5.7484 | 0.9602 | 1.67 | 20.3 | 34.65 | −48.7896 |
| S12 | aspheric | −4.9101 | 0.2064 | | | | −10.0000 |
| S13 | spherical | infinite | 0.1210 | 1.52 | 64.2 | | |
| S14 | spherical | infinite | 0.2776 | | | | |
| S15 | spherical | infinite | | | | | |

In this example, a total effective focal length $f_C$ of the telephoto lens group satisfies $f_C$=7.50 mm, a distance $TTL_C$ along the optical axis of the telephoto lens group from the object-side surface S1 of the telephoto first lens E1 to the imaging plane S15 satisfies $TTL_C$=6.32 mm, half of a diagonal length $ImgH_C$ of an effective pixel area on the imaging plane S15 satisfies $ImgH_C$=2.94 mm, half of a maximal field-of-view Semi-$FOV_C$ of the telephoto lens group satisfies Semi-$FOV_C$=21.1°, and an ideal distance $P_C$ for the telephoto lens group along the optical axis of the telephoto lens group from the to-be-captured object to the object-side surface of the telephoto first lens is infinite.

In example 7, the object-side surface and the image-side surface of any one of the telephoto first lens E1 to the telephoto sixth lens E6 are aspheric. Table 14 below shows high-order coefficients A4, A6, A8, A10, A12, A14, A16, A18 and A20 applicable to each aspheric surface S1-S12 in example 7.

TABLE 14

| Surface number | A4 | A6 | A8 | A10 | A12 | A14 | A16 | A18 |
|---|---|---|---|---|---|---|---|---|
| S1 | 7.4580E−03 | −1.4760E−02 | 7.3710E−02 | −1.8329E−01 | 2.7951E−01 | −2.5844E−01 | 1.4026E−01 | −4.0330E−02 |
| S2 | 1.3854E−02 | 1.3897E−02 | 1.2535E−02 | −5.0640E−02 | 2.0455E−02 | 6.0648E−02 | −9.6350E−02 | 5.3212E−02 |
| S3 | −4.9040E−02 | 1.6878E−01 | −3.5585E−01 | 1.1509E+00 | −2.7186E+00 | 3.9618E+00 | −3.4367E+00 | 1.6139E+00 |
| S4 | −7.6430E−02 | 3.5392E−01 | −1.4193E+00 | 5.2238E+00 | −8.7832E+00 | 9.8223E−01 | 1.9585E+01 | −2.7432E+01 |
| S5 | −3.6490E−02 | 4.2011E−02 | 5.6542E−02 | 3.2632E−01 | 1.4787E+00 | −9.3468E+00 | 1.8436E+01 | −1.6756E+01 |
| S6 | 3.9890E−02 | −6.6530E−02 | −4.8710E−02 | 2.2956E+00 | −4.8761E+00 | 1.0567E+00 | 1.0851E+01 | −1.6543E+01 |
| S7 | 8.1002E−02 | −5.5220E−01 | 1.3232E+00 | −1.8916E+00 | 2.6289E+00 | −2.8153E+00 | 2.1409E+00 | −1.2093E+00 |
| S8 | 6.2596E−02 | −6.0065E−01 | 2.4215E+00 | −8.2222E+00 | 2.0480E+01 | −3.2903E+01 | 3.2279E+01 | −1.7475E+01 |
| S9 | −1.5123E−01 | −1.0873E−01 | 2.5060E−01 | −3.1437E−01 | 1.3906E−01 | 6.3693E−02 | −1.1488E−01 | 5.5316E−02 |
| S10 | −8.2810E−02 | −1.1161E−01 | 2.8866E−01 | −3.7741E−01 | 3.0513E−01 | −1.5805E−01 | 5.0423E−02 | −8.9500E−03 |
| S11 | −1.4530E−02 | −7.9100E−03 | 2.1639E−02 | −1.0220E−02 | 1.6920E−03 | 1.3200E−04 | −9.5000E−05 | 1.3900E−05 |
| S12 | −3.4940E−02 | 7.2500E−04 | −2.7900E−03 | 3.0950E−03 | −3.8000E−04 | −2.0000E−04 | 6.5000E−05 | −7.0000E−06 |

| Surface number | A20 |
|---|---|
| S1 | 4.5460E−03 |
| S2 | −1.0310E−02 |
| S3 | −3.1249E−01 |
| S4 | 1.2120E+01 |
| S5 | 5.9474E+00 |
| S6 | 7.5592E+00 |
| S7 | 3.4938E−01 |
| S8 | 3.9695E+00 |
| S9 | −9.1200E−03 |
| S10 | 6.6800E−04 |
| S11 | −7.2000E−07 |
| S12 | 2.6300E−07 |

Figure 17A:
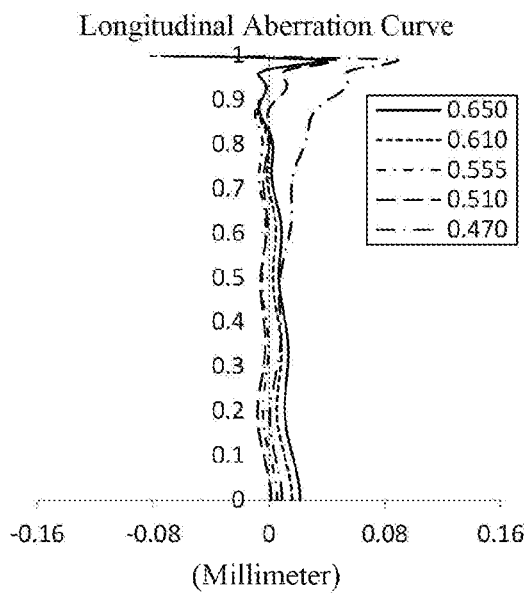
FIGS. 17A to 17D illustrate a longitudinal aberration curve, an astigmatic curve, a distortion curve and a lateral color curve of the telephoto lens group of the Example 7, respectively.
Figure 17B:
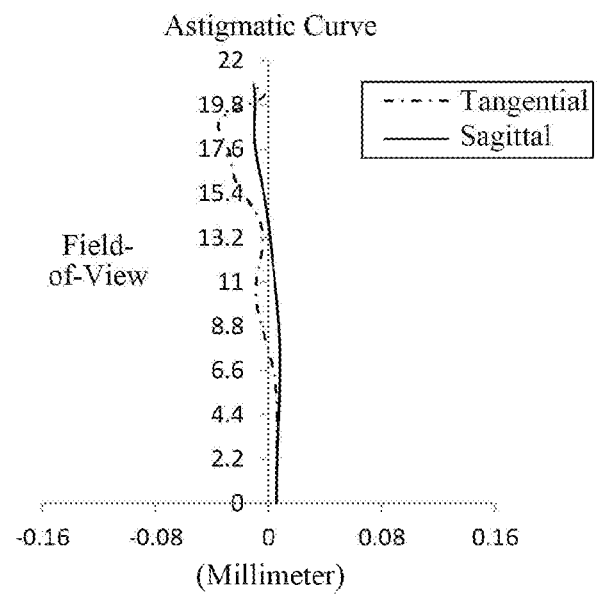
Figure 17C:
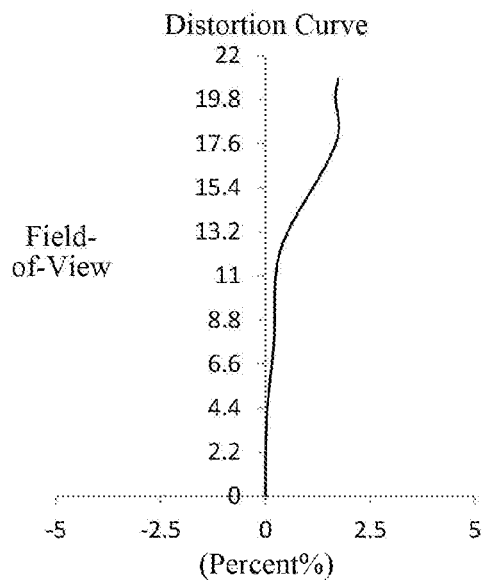
Figure 17D:
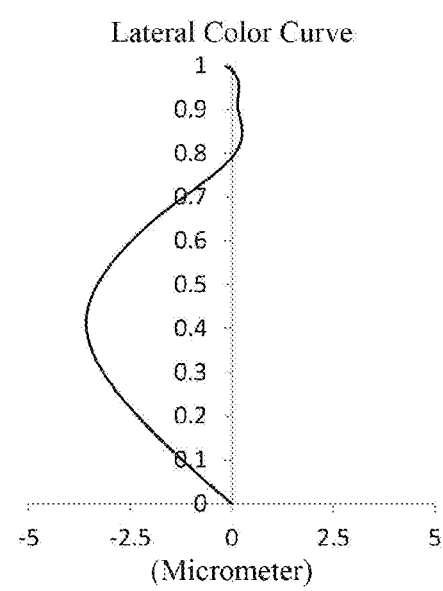

FIG. 17A illustrates a longitudinal aberration curve of the telephoto lens group according to example 7, representing deviations of focal points converged by light of different wavelengths after passing through the lens assembly. FIG. 17B illustrates an astigmatic curve of the telephoto lens group according to example 7, representing a curvature of a tangential plane and a curvature of a sagittal plane. FIG. 17C illustrates a distortion curve of the telephoto lens group according to example 7, representing amounts of distortion at different field-of-views. FIG. 17D illustrates a lateral color curve of the telephoto lens group according to example 7, representing deviations of different image heights on an imaging plane after light passes through the lens assembly. It can be seen from FIG. 17A to FIG. 17D that the telephoto lens group provided in example 7 may achieve a good image quality.

EXAMPLE 8

Figure 18:
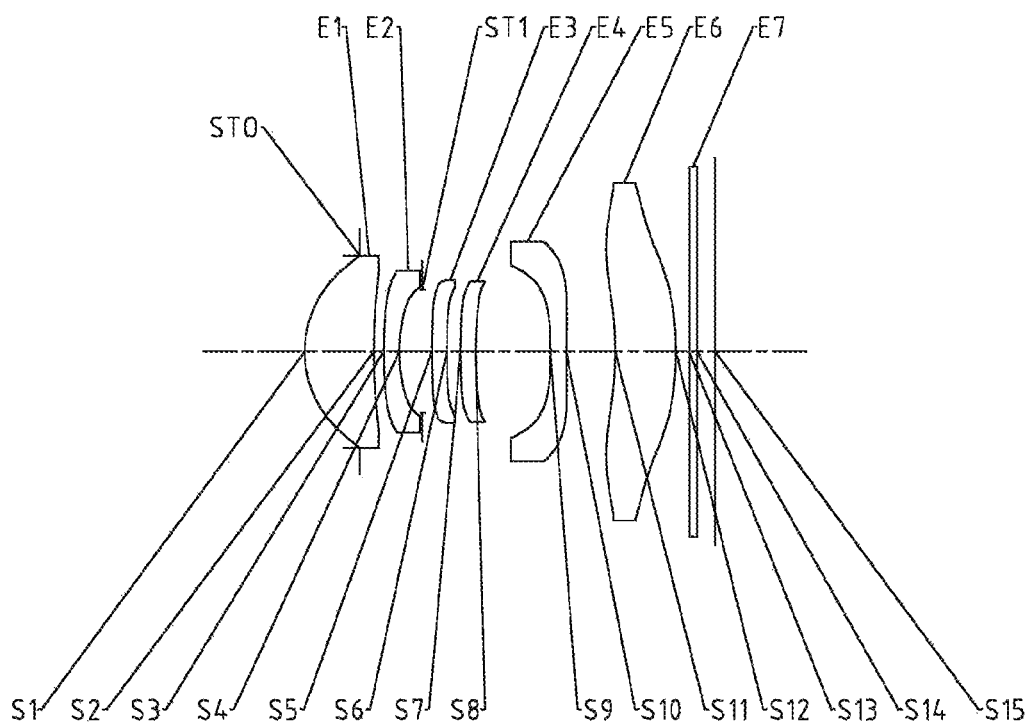
FIG. 18 illustrates a schematic structural view of a telephoto lens group according to Example 8 of the present disclosure.

A telephoto lens group according to example 8 of the present disclosure is described below with reference to FIG. 18 to FIG. 19D. FIG. 18 shows a schematic structural view of the telephoto lens group according to example 8 of the present disclosure.

As shown in FIG. 18, the telephoto lens group includes a stop STO, a telephoto first lens E1, a telephoto second lens E2, a stop ST1, a telephoto third lens E3, a telephoto fourth lens E4, a telephoto fifth lens E5, a telephoto sixth lens E6, an optical filter E7 and an imaging plane S15, which are sequentially from an object side to an image side along an optical axis of the telephoto lens group.

The telephoto first lens E1 has a positive refractive power, an object-side surface S1 thereof is a convex surface, and an image-side surface S2 thereof is a concave surface. The telephoto second lens E2 has a negative refractive power, an object-side surface S3 thereof is a convex surface, and an image-side surface S4 thereof is a concave surface. The telephoto third lens E3 has a positive refractive power, an object-side surface S5 thereof is a convex surface, and an image-side surface S6 thereof is a concave surface. The telephoto fourth lens E4 has a negative refractive power, an object-side surface S7 thereof is a convex surface, and an image-side surface S8 thereof is a concave surface. The telephoto fifth lens E5 has a negative refractive power, an object-side surface S9 thereof is a concave surface, and an image-side surface S10 thereof is a concave surface. The telephoto sixth lens E6 has a negative refractive power, an object-side surface S11 thereof is a concave surface, and an image-side surface S12 thereof is a convex surface. The optical filter E7 has an object-side surface S13 and an image-side surface S14. Light from an object sequentially passes through the respective surfaces S1 to S14 and is finally imaged on the imaging plane S15.

Table 15 shows a table of basic parameters of the telephoto lens group in example 8, wherein the units for the radius of curvature, the thickness and the focal length are millimetre (mm).

TABLE 15

| Surface number | Surface type | Radius of curvature | Thickness/ Distance | Material Refractive index | Abbe number | Focal length | Conic coefficient |
|---|---|---|---|---|---|---|---|
| OBJ | spherical | infinite | infinite | | | | |
| STO | spherical | infinite | −0.8518 | | | | |
| S1 | aspheric | 1.6546 | 1.0675 | 1.55 | 56.1 | 3.38 | −0.1558 |
| S2 | aspheric | 12.2213 | 0.1506 | | | | −4.5643 |
| S3 | aspheric | 7.0268 | 0.2413 | 1.68 | 19.2 | −6.28 | 22.4303 |
| S4 | aspheric | 2.6129 | 0.3507 | | | | 3.5560 |
| ST1 | spherical | infinite | 0.1502 | | | | |
| S5 | aspheric | 13.5592 | 0.2310 | 1.68 | 19.2 | 417.87 | 50.0057 |
| S6 | aspheric | 14.1432 | 0.2111 | | | | 57.7075 |
| S7 | aspheric | 11.1550 | 0.2310 | 1.55 | 56.1 | −22.67 | 98.9692 |
| S8 | aspheric | 5.8241 | 1.1550 | | | | 20.6955 |
| S9 | aspheric | −11.4741 | 0.2420 | 1.55 | 56.1 | −7.95 | 62.8676 |
| S10 | aspheric | 7.0290 | 0.7571 | | | | −38.3419 |
| S11 | aspheric | −5.4184 | 0.9316 | 1.67 | 20.3 | −1212.96 | −52.7062 |
| S12 | aspheric | −5.8300 | 0.2064 | | | | −10.0000 |
| S13 | spherical | infinite | 0.1210 | 1.52 | 64.2 | | |
| S14 | spherical | infinite | 0.2776 | | | | |
| S15 | spherical | infinite | | | | | |

In this example, a total effective focal length $f_C$ of the telephoto lens group satisfies $f_C$=7.59 mm, a distance $TTL_C$ along the optical axis of the telephoto lens group from the object-side surface S1 of the telephoto first lens E1 to the imaging plane S15 satisfies $TTL_C$=6.32 mm, half of a diagonal length $ImgH_C$ of an effective pixel area on the imaging plane S15 satisfies $ImgH_C$=2.94 mm, half of a maximal field-of-view Semi-$FOV_C$ of the telephoto lens group satisfies Semi-$FOV_C$=20.9°, and an ideal distance $P_C$ for the telephoto lens group along the optical axis of the telephoto lens group from the to-be-captured object to the object-side surface of the telephoto first lens is infinite.

In example 8, the object-side surface and the image-side surface of any one of the telephoto first lens E1 to the telephoto sixth lens E6 are aspheric. Table 16 below shows high-order coefficients A4, A6, A8, A10, A12, A14, A16, A18 and A20 applicable to each aspheric surface S1-S12 in example 8.

TABLE 16

| Surface number | A4 | A6 | A8 | A10 | A12 | A14 | A16 | A18 |
|---|---|---|---|---|---|---|---|---|
| S1 | 7.4510E−03 | −1.4620E−02 | 7.2840E−02 | −1.7954E−01 | 2.7136E−01 | −2.4818E−01 | 1.3286E−01 | −3.7530E−02 |
| S2 | 1.3759E−02 | 1.3666E−02 | 1.4978E−02 | −6.0060E−02 | 3.9572E−02 | 3.8061E−02 | −8.1030E−02 | 4.7771E−02 |
| S3 | −4.8360E−02 | 1.6932E−01 | −3.6865E−01 | 1.2211E+00 | −2.9057E+00 | 4.2467E+00 | −3.6857E+00 | 1.7309E+00 |
| S4 | −7.4630E−02 | 3.0931E−01 | −1.0246E+00 | 3.1144E+00 | −1.8106E+00 | −1.3437E+01 | 3.7893E+01 | −4.0499E+01 |
| S5 | −2.9100E−02 | −6.7000E−02 | 9.3196E−01 | −3.9661E+00 | 1.4831E+01 | −3.5611E+01 | 5.0073E+01 | −3.7979E+01 |
| S6 | 4.0197E−02 | −6.6260E−02 | −8.9240E−02 | 2.7588E+00 | −6.0080E+00 | 9.5735E−01 | 1.5394E+01 | −2.3288E+01 |
| S7 | 5.1793E−02 | −3.4480E−01 | 4.6475E−01 | 1.4067E+00 | −5.9092E+00 | 1.0755E+01 | −1.0252E+01 | 4.5907E+00 |
| S8 | 2.1439E−02 | −1.3785E−01 | 2.2096E+00 | −9.2957E+00 | 2.7182E+01 | −4.9923E+01 | 5.5242E+01 | −3.3403E+01 |
| S9 | −2.3916E−01 | 1.7330E−01 | −1.1489E−01 | −9.2080E−02 | 1.3773E−01 | −6.3110E−02 | −1.1670E−02 | 2.0669E−02 |
| S10 | −1.9064E−01 | 2.0698E−01 | −1.2279E−01 | −6.4450E−02 | 1.6955E−01 | −1.3783E−01 | 5.8781E−02 | −1.3000E−02 |
| S11 | −6.5330E−02 | 5.4109E−02 | −1.7300E−02 | 6.8500E−03 | −3.6300E−03 | 1.1960E−03 | −2.1000E−04 | 1.8600E−05 |
| S12 | −4.7240E−02 | 3.7660E−03 | 1.3617E−02 | −1.8550E−02 | 1.2654E−02 | −4.5500E−03 | 8.8700E−04 | −8.9000E−05 |

| Surface number | A20 |
|---|---|
| S1 | 4.1130E−03 |
| S2 | −9.5400E−03 |
| S3 | −3.3551E−01 |
| S4 | 1.6154E+01 |
| S5 | 1.1985E+01 |
| S6 | 1.0600E+01 |
| S7 | −6.9471E−01 |
| S8 | 8.4197E+00 |
| S9 | −4.8200E−03 |
| S10 | 1.1640E−03 |
| S11 | −6.5000E−07 |
| S12 | 3.6400E−06 |

Figure 19A:
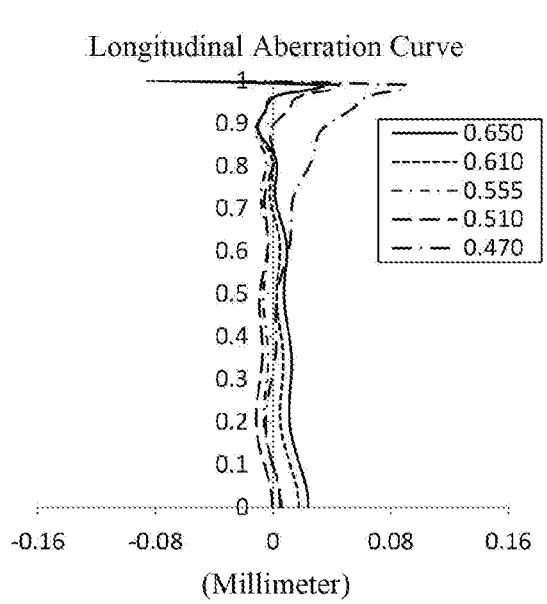
FIGS. 19A to 19D illustrate a longitudinal aberration curve, an astigmatic curve, a distortion curve and a lateral color curve of the telephoto lens group of the Example 8, respectively.
Figure 19B:
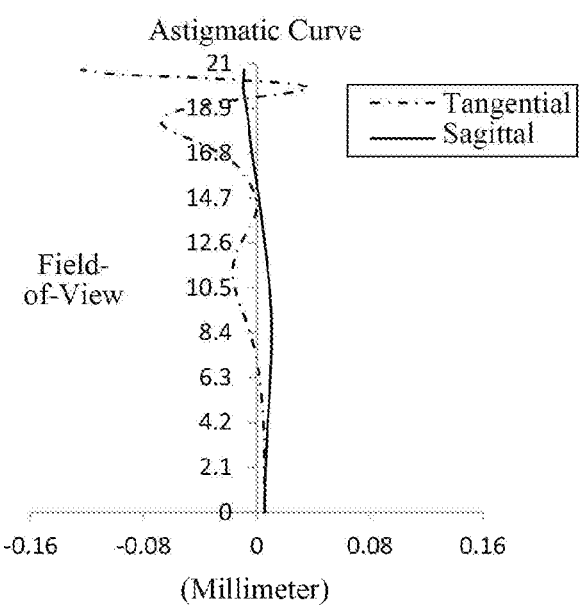
Figure 19C:
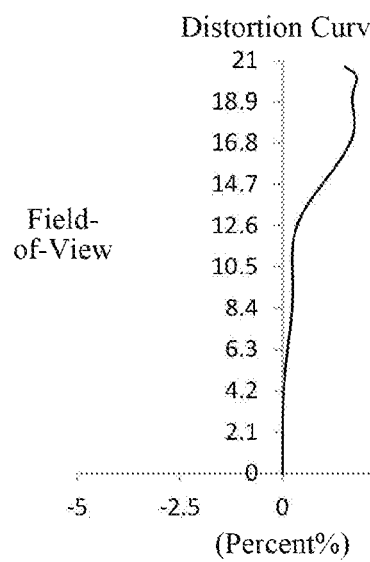
Figure 19D:
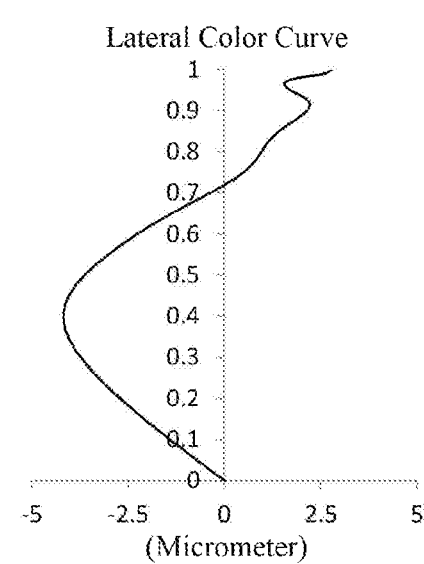

FIG. 19A illustrates a longitudinal aberration curve of the telephoto lens group according to example 8, representing deviations of focal points converged by light of different wavelengths after passing through the lens assembly. FIG. 19B illustrates an astigmatic curve of the telephoto lens group according to example 8, representing a curvature of a tangential plane and a curvature of a sagittal plane. FIG. 19C illustrates a distortion curve of the telephoto lens group according to example 8, representing amounts of distortion at different field-of-views. FIG. 19D illustrates a lateral color curve of the telephoto lens group according to example 8, representing deviations of different image heights on an imaging plane after light passes through the lens assembly. It can be seen from FIG. 19A to FIG. 19D that the telephoto lens group provided in example 8 may achieve a good image quality.

In view of the above, examples 1 to 8 respectively satisfy the relationship shown in Table 17 below.

TABLE 17

| Condition/Example | 1 | 2 | 3 | 4 | 5 | 6 | 7 | 8 |
|---|---|---|---|---|---|---|---|---|
| $f_A/EPD_A$ | 1.94 | 1.80 | | | | | | |
| $f_B/EPD_B$ | | | 1.57 | 1.41 | 1.39 | | | |
| $f_B/(f1_B + f2_B + f6_B)$ | | | 0.95 | 0.83 | 0.75 | | | |
| $(R1_B + R2_B)/(R11_B + R12_B)$ | | | 1.32 | 1.83 | 1.79 | | | |
| $ImgH_B/f_B$ | | | 0.87 | 0.83 | 0.86 | | | |
| $ImgH_B/ImgH_C$ | | | 1.37 | 1.33 | 1.45 | | | |
| $f_C/(f1_C + f2_C - f5_C)$ | | | | | | 1.77 | 1.56 | 1.50 |
| $(R9_C + R10_C)/(R11_C + R12_C)$ | | | | | | 0.72 | 0.65 | 0.40 |

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An imaging apparatus, comprising:
a macro lens group having an effective focal length $f_A$;
a wide-angle lens group having an effective focal length $f_B$; and
a telephoto lens group having an effective focal length $f_C$;
wherein $f_A < f_B < f_C$, $0.20 < f_A/f_B < 0.80$, and $0.10 < f_A/f_C < 0.50$.

2. The imaging apparatus according to claim 1, wherein 1.0 mm $< f_A <$ 3.7 mm, where $f_A$ is the effective focal length of the macro lens group.

3. The imaging apparatus according to claim 1, wherein 4.6 mm $< f_B <$ 5.0 mm, where $f_B$ is the effective focal length of the wide-angle lens group.

4. The imaging apparatus according to claim 1, wherein 7.4 mm $< f_C <$ 7.7 mm, where $f_C$ is the effective focal length of the telephoto lens group.

5. The imaging apparatus according to claim 1, wherein $1.3 < ImgH_B/ImgH_C < 1.5$,
where $ImgH_B$ is half of a diagonal length of an effective pixel area on an imaging plane of the wide-angle lens group and $ImgH_C$ is half of a diagonal length of an effective pixel area on an imaging plane of the telephoto lens group.

6. The imaging apparatus according to claim 1, wherein $f_A/EPD_A < 1.95$,
where $f_A$ is the effective focal length of the macro lens group and $EPD_A$ is an entrance pupil diameter of the macro lens group.

7. The imaging apparatus according to claim 1, wherein $f_B/EPD_B < 1.6$,
where $f_B$ is the effective focal length of the wide-angle lens group and $EPD_B$ is an entrance pupil diameter of the wide-angle lens group.

8. The imaging apparatus according to claim 1, wherein $20° <$ Semi-FOV$_C < 21.5°$,
where Semi-FOV$_C$ is half of a maximal field-of-view of the telephoto lens group.

9. The imaging apparatus according to claim 1, wherein the macro lens group, sequentially from an object side to an image side along an optical axis of the macro lens group, comprising:
a macro first lens having a refractive power, an object-side surface of the macro first lens being convex, and an image-side surface of the macro first lens being concave;
a macro second lens having a refractive power, an object-side surface of the macro second lens being convex, and an image-side surface of the macro second lens being concave;
a macro third lens having a positive refractive power, an object-side surface of the macro third lens being convex, and an image-side surface of the macro third lens being convex;
a macro fourth lens having a negative refractive power, and an object-side surface of the macro fourth lens being concave;
a macro fifth lens having a positive refractive power, an object-side surface of the macro fifth lens being convex; and
a macro sixth lens having a refractive power, an object-side surface of the macro sixth lens being convex, and an image-side surface of the macro sixth lens being concave.

10. The imaging apparatus according to claim 9, wherein there is a gap along the optical axis of the macro lens group between each two adjacent lenses of the macro lens group.

11. The imaging apparatus according to claim 1, wherein the wide-angle lens group, sequentially from an object side to an image side along an optical axis of the wide-angle lens group, comprising:
a wide-angle first lens having a positive refractive power;
a wide-angle second lens having a positive refractive power;
a wide-angle third lens having a negative refractive power;
a wide-angle fourth lens having a refractive power;

a wide-angle fifth lens having a positive refractive power; and a wide-angle sixth lens having a negative refractive power.

12. The imaging apparatus according to claim 11, wherein
an object-side surface of the wide-angle first lens is convex, and an image-side surface of the wide-angle first lens is concave;
an object-side surface of the wide-angle second lens is convex, and an image-side surface of the wide-angle second lens is convex;
an object-side surface of the wide-angle third lens is convex, and an image-side surface of the wide-angle third lens is concave;
an image-side surface of the wide-angle fourth lens is convex; and
an object-side surface of the wide-angle sixth lens is convex, and an image-side surface of the wide-angle sixth lens is concave.

13. The imaging apparatus according to claim 11, wherein $0.7 < f_B/(f1_B + f2_B + f6_B) < 1.0$,
where $f_B$ is the effective focal length of the wide-angle lens group, $f1_B$ is an effective focal length of the wide-angle first lens, $f2_B$ is an effective focal length of the wide-angle second lens, and $f6_B$ is an effective focal length of the wide-angle sixth lens.

14. The imaging apparatus according to claim 11, wherein $1.3 < (R1_B + R2_B)/(R11_B + R12_B) < 1.9$,
where $R1_B$ is a radius of curvature of an object-side surface of the wide-angle first lens, $R2_B$ is a radius of curvature of an image-side surface of the wide-angle first lens, $R11_B$ is a radius of curvature of an object-side surface of the wide-angle sixth lens, and $R12_B$ is a radius of curvature of an image-side surface of the wide-angle sixth lens.

15. The imaging apparatus according to claim 11, wherein $0.8 < \text{ImgH}_B/f_B < 0.9$,
where $\text{ImgH}_B$ is half of a diagonal length of an effective pixel area on an imaging plane of the wide-angle lens group and $f_B$ is the effective focal length of the wide-angle lens group.

16. The imaging apparatus according to claim 1, wherein the telephoto lens group, sequentially from an object side to an image side along an optical axis of the telephoto lens group, comprising:
a telephoto first lens having a positive refractive power;
a telephoto second lens having a negative refractive power;
a telephoto third lens having a refractive power;
a telephoto fourth lens having a negative refractive power;
a telephoto fifth lens having a negative refractive power; and
a telephoto sixth lens having a refractive power.

17. The imaging apparatus according to claim 16, wherein
an object-side surface of the telephoto first lens is convex, and an image-side surface of the telephoto first lens is concave;
an object-side surface of the telephoto second lens is convex, and an image-side surface of the telephoto second lens is concave;
an object-side surface of the telephoto third lens is convex, and an image-side surface of the telephoto third lens is concave;
an object-side surface of the telephoto fourth lens is convex, and an image-side surface of the telephoto fourth lens is concave;
an object-side surface of the telephoto fifth lens is concave, and an image-side surface of the telephoto fifth lens is concave; and
an object-side surface of the telephoto sixth lens is concave, and an image-side surface of the telephoto sixth lens is convex.

18. The imaging apparatus according to claim 16, wherein $1.4 < f_C/(f1_C + f2_C - f5_C) < 1.8$,
where $f_C$ is the effective focal length of the telephoto lens group, $f1_C$ is an effective focal length of the telephoto first lens, $f2_C$ is an effective focal length of the telephoto second lens, and $f5_C$ is an effective focal length of the telephoto fifth lens.

19. The imaging apparatus according to claim 16, wherein $0.3 < (R9_C + R10_C)/(R11_C + R12_C) < 0.8$,
where $R9_C$ is a radius of curvature of an object-side surface of the telephoto fifth lens, $R10_C$ is a radius of curvature of an image-side surface of the telephoto fifth lens, $R11_C$ is a radius of curvature of an object-side surface of the telephoto sixth lens, and $R12_C$ is a radius of curvature of an image-side surface of the telephoto sixth lens.

20. An electronic device, comprising:
the imaging apparatus according to claim 1, wherein the macro lens group, the wide-angle lens group and the telephoto lens group are arranged in a horizontal direction or a vertical direction on one side of the electronic device;
a focus measuring apparatus connected to the imaging apparatus and configured to obtain a distance of the imaging apparatus from an object; and
a processor connected to the imaging apparatus and the focus measuring apparatus and configured to:
in response to the distance of the imaging apparatus from the object being between 30 mm and 90 mm, activate the macro lens group and deactivate the wide-angle lens group and the telephoto lens group; and
in response to the distance of the imaging apparatus from the object being between 1000 mm and 1500 mm, activate at least one of the wide-angle lens group and the telephoto lens group and deactivate the macro lens group.

* * * * *

UNITED STATES PATENT AND TRADEMARK OFFICE
CERTIFICATE OF CORRECTION

| | | |
|---|---|---|
| PATENT NO. | : 11,550,131 B2 | Page 1 of 1 |
| APPLICATION NO. | : 16/893900 | |
| DATED | : January 10, 2023 | |
| INVENTOR(S) | : Liefeng Zhao et al. | |

It is certified that error appears in the above-identified patent and that said Letters Patent is hereby corrected as shown below:

On the Title Page

Add item (30) Foreign Application Priority Data:
-- Jul. 18, 2019 (CN) .............................. 201910651695 --

Signed and Sealed this
Nineteenth Day of September, 2023

Katherine Kelly Vidal
*Director of the United States Patent and Trademark Office*